(12) United States Patent
McNall et al.

(10) Patent No.: US 12,594,519 B2
(45) Date of Patent: Apr. 7, 2026

(54) METHODS FOR REGENERATING A FILTER MEDIUM AND CLEANING FLUE GAS

(71) Applicant: W. L. Gore & Associates, Inc., Newark, DE (US)

(72) Inventors: Monaca A. McNall, Newark, DE (US); Zhuonan Song, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 665 days.

(21) Appl. No.: 18/016,574

(22) PCT Filed: Jul. 9, 2021

(86) PCT No.: PCT/US2021/041127
§ 371 (c)(1),
(2) Date: Jan. 17, 2023

(87) PCT Pub. No.: WO2022/015593
PCT Pub. Date: Jan. 20, 2022

(65) Prior Publication Data
US 2023/0294032 A1     Sep. 21, 2023

Related U.S. Application Data

(60) Provisional application No. 63/052,303, filed on Jul. 15, 2020.

(51) Int. Cl.
B01D 53/02     (2006.01)
B01D 46/82     (2022.01)
(Continued)

(52) U.S. Cl.
CPC ......... B01D 46/82 (2022.01); B01D 53/8625 (2013.01); B01D 53/96 (2013.01);
(Continued)

(58) Field of Classification Search
CPC .. B01D 2251/2062; B01D 2255/20707; B01D 2255/20723; B01D 2255/2073;
(Continued)

(56) References Cited

U.S. PATENT DOCUMENTS

| | | | |
|---|---|---|---|
| 3,953,556 A | 4/1976 | Wilhelm et al. | |
| 4,070,305 A | 1/1978 | Obayashi et al. | |
| 5,318,755 A | 6/1994 | Kuivalainen et al. | |
| 5,620,669 A * | 4/1997 | Plinke ...................... | B01J 31/06 442/40 |

(Continued)

FOREIGN PATENT DOCUMENTS

| | | |
|---|---|---|
| CN | 105126618 A | 12/2015 |
| CN | 107051203 A | 8/2017 |

(Continued)

OTHER PUBLICATIONS

International Preliminary Report on Patentability received for PCT Patent Application No. PCT/US2021/041127, mailed on Jan. 26, 2023, 8 pages.

*Primary Examiner* — Christopher P Jones

(57)     ABSTRACT

The invention discloses an efficient medium and low temperature sulfur-containing flue gas denitration device and method based on Fast SCR reaction, and the sulfur-containing flue gas denitration device and method can be used in a utility boiler and flues on the tail portions of various industrial furnace. The sulfur-containing flue gas denitration device comprises an oxidization module used for oxidizing NO and an SCR reaction module used or denitration, part of NO in flue gas is converted into NO2 through the oxidization module and then enters the SCR reaction module, and pre-oxidized flue gas and sprayed NH3 are mixed and enter a selective catalytic reduction layer to conduct rapid SCR reaction. The catalytic reduction layer is made of a low-vanadium loaded vanadium, tungsten and titanium cellular catalyst, and the reaction temperature is 200-350 DEG C. The denitration system has efficient sulfur poisoning resistance and greatly promotes denitration efficiency of the flue (Continued)

gas low-temperature section, it is verified through experiments that under the low-temperature sulfur-containing flue gas atmosphere at the temperature of 250 DEG C, the system has the obvious denitration effect, and the efficiency can reach 90% or more and is kept stable.

20 Claims, 5 Drawing Sheets

(51) Int. Cl.
  *B01D 53/86* (2006.01)
  *B01D 53/96* (2006.01)
  *F23J 15/02* (2006.01)

(52) U.S. Cl.
  CPC ..... *F23J 15/025* (2013.01); *B01D 2251/2062* (2013.01); *B01D 2257/404* (2013.01); *B01D 2258/0283* (2013.01); *F23J 2215/10* (2013.01); *F23J 2219/10* (2013.01)

(58) Field of Classification Search
  CPC ........... B01D 2255/20769; B01D 2255/20776; B01D 2257/404; B01D 2258/0283; B01D 46/0027; B01D 46/02; B01D 46/82; B01D 46/84; B01D 53/8625; B01D 53/96; F23J 15/025; F23J 2215/10; F23J 2215/20; F23J 2219/10; Y02C 20/30
  See application file for complete search history.

(56) References Cited

U.S. PATENT DOCUMENTS

| | | | |
|---|---|---|---|
| 7,791,861 | B2 | 9/2010 | Zhong et al. |
| 10,940,471 | B1 * | 3/2021 | Song ........................ B01J 21/08 |
| 11,071,947 | B2 * | 7/2021 | Song ........................ B01J 38/04 |
| 11,602,717 | B2 * | 3/2023 | Song .................. B01D 53/8631 |
| 2007/0053818 | A1 | 3/2007 | Lauterbach et al. |
| 2008/0089822 | A1 | 4/2008 | Frey et al. |
| 2017/0173525 | A1 | 6/2017 | Suchak |
| 2019/0240620 | A1 | 8/2019 | Zhang et al. |
| 2019/0282959 | A1 | 9/2019 | Zhang et al. |

FOREIGN PATENT DOCUMENTS

| | | |
|---|---|---|
| CN | 108883363 A | 11/2018 |
| CN | 109789372 A | 5/2019 |
| EP | 1072302 A1 | 1/2001 |
| EP | 1870155 A1 | 12/2007 |
| EP | 3677335 A1 | 7/2020 |
| JP | 54-016394 A | 2/1979 |
| JP | 09-290136 A | 11/1997 |
| JP | 10-192655 A | 7/1998 |
| JP | 10-230119 A | 9/1998 |
| JP | 11-508822 A | 8/1999 |
| JP | 2001-054707 A | 2/2001 |
| JP | 2008-253877 A | 10/2008 |
| JP | 2019-534782 A | 12/2019 |
| WO | 97/06877 A1 | 2/1997 |
| WO | 2009/000359 A2 | 12/2008 |
| WO | 2018/055162 A1 | 3/2018 |
| WO | 2018/158183 A1 | 9/2018 |

* cited by examiner

METHODS FOR REGENERATING A FILTER MEDIUM AND CLEANING FLUE GAS

CROSS-REFERENCE TO RELATED APPLICATION

This application is a national phase application of PCT Application No. PCT/US2021/041127, internationally filed on Jul. 9, 2021, which claims the benefit of U.S. Provisional Application 63/052,303, filed Jul. 15, 2020, which are herein incorporated by reference in their entireties for all purposes.

FIELD

The present disclosure generally relates to one or more of methods of regenerating at least one filter medium and methods of cleaning a flue gas stream.

BACKGROUND

Coal-fired power generation plants, municipal waste incinerators, and oil refinery plants generate large amounts of flue gases that contain substantial varieties and quantities of environmental pollutants, nitrogen oxides ($NO_x$ compounds), mercury (Hg) vapor, and particulate matters (PM). In the United States, burning coal alone generates about 27 million tons of $SO_2$ and 45 tons of Hg each year.

SUMMARY

There is a need for improvements to methods for removing $NO_x$ compounds, sulfur oxides, mercury vapor, and fine particulate matters from industrial flue gases, such as coal-fired power plant flue gas.

Some embodiments of the present disclosure relate to a method of regenerating at least one filter medium, the method comprising: providing at least one filter medium; wherein the at least one filter medium comprises: at least one catalyst material; and ammonium bisulfate (ABS), ammonium sulfate (AS), or any combination thereof; flowing a flue gas stream through or by the at least one filter medium; wherein the flue gas stream comprises: $NO_x$ compounds comprising: Nitric Oxide (NO), and Nitrogen Dioxide ($NO_2$); wherein the flue gas stream is at a first temperature during the flowing step; increasing $NO_x$ removal efficiency of the at least one filter medium; wherein the increasing of the $NO_x$ removal efficiency of the at least one filter medium comprises: adding ammonia ($NH_3$) in a concentration ranging from 0.0001% to 0.5% of the concentration of the flue gas stream; and increasing the temperature of the flue gas stream from the first temperature to a second temperature that exceeds the first temperature.

Some embodiments of the present disclosure relate to a method of cleaning a flue gas stream, the method comprising: providing at least one filter medium, wherein the at least one filter medium comprises at least one catalyst material; flowing a flue gas stream transverse to a cross-section of the at least one filter medium, such that the flue gas stream passes through the cross section of the at least one filter medium from an upstream side of the filter medium to a downstream side of the filter medium; wherein the flue gas stream comprises: $NO_x$ compounds comprising: Nitric Oxide (NO), and Nitrogen Dioxide ($NO_2$); Sulfur Dioxide ($SO_2$); and Ammonia ($NH_3$); wherein the flue gas stream is at a first temperature during the flowing step; and maintaining a constant $NO_x$ removal efficiency of the at least one filter medium; wherein the maintaining a constant $NO_x$ removal efficiency of the at least one filter medium comprises increasing the temperature of the flue gas stream from the first temperature to a second temperature that exceeds the first temperature.

Some embodiments of the present disclosure relate to a method of cleaning a flue gas stream, the method comprising: providing at least one filter medium, wherein the at least one filter medium comprises at least one catalyst material; flowing a flue gas stream by a cross-section of the at least one filter medium, such that the flue gas stream is flowed parallel to a cross-section of the at least one filter medium from an upstream side of the filter medium to a downstream side of the filter medium; wherein the flue gas stream comprises: $NO_x$ compounds comprising: Nitric Oxide (NO), and Nitrogen Dioxide ($NO_2$); Sulfur Dioxide ($SO_2$); and Ammonia ($NH_3$); wherein the flue gas stream is at a first temperature during the flowing step; maintaining a constant $NO_x$ removal efficiency of the at least one filter medium; wherein the maintaining a constant $NO_x$ removal efficiency of the at least one filter medium comprises increasing the temperature of the flue gas stream from the first temperature to a second temperature that exceeds the first temperature.

Some embodiments of the present disclosure relate to a method of cleaning a flue gas stream, the method comprising: providing at least one filter medium, wherein the at least one filter medium comprises at least one catalyst material; flowing a flue gas stream transverse to a cross-section of the at least one filter medium, such that the flue gas stream passes through the cross section of the at least one filter medium from an upstream side of the filter medium to a downstream side of the filter medium; wherein the flue gas stream comprises: $NO_x$ compounds comprising: Nitric Oxide (NO), and Nitrogen Dioxide ($NO_2$); Sulfur Dioxide ($SO_2$); and Ammonia ($NH_3$); wherein the flue gas stream is at a first temperature during the flowing step; maintaining a $NO_x$ removal efficiency of the at least one filter medium in an amount of at least 70% of an initial $NO_x$ efficiency by increasing the temperature of the flue gas stream from the first temperature to a second temperature that exceeds the first temperature.

In some embodiments, the second temperature is at least 10° C. higher than the first temperature.

In some embodiments, the second temperature is 10° C. to 100° C. higher than the first temperature.

In some embodiments, the first temperature ranges from 180° C. to 230° C.

In some embodiments, the second temperature is at least 240° C.

In some embodiments, the second temperature is at most 280° C.

In some embodiments, the second temperature ranges from 240° C. to 280° C.

In some embodiments, the second temperature ranges from 240° C. to 260° C.

In some embodiments, a concentration of $SO_2$ in the flue gas stream does not exceed 1000 ppm during the maintaining step.

In some embodiments, a concentration of $SO_2$ in the flue gas stream does not exceed 10 ppm during the maintaining step.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1A:
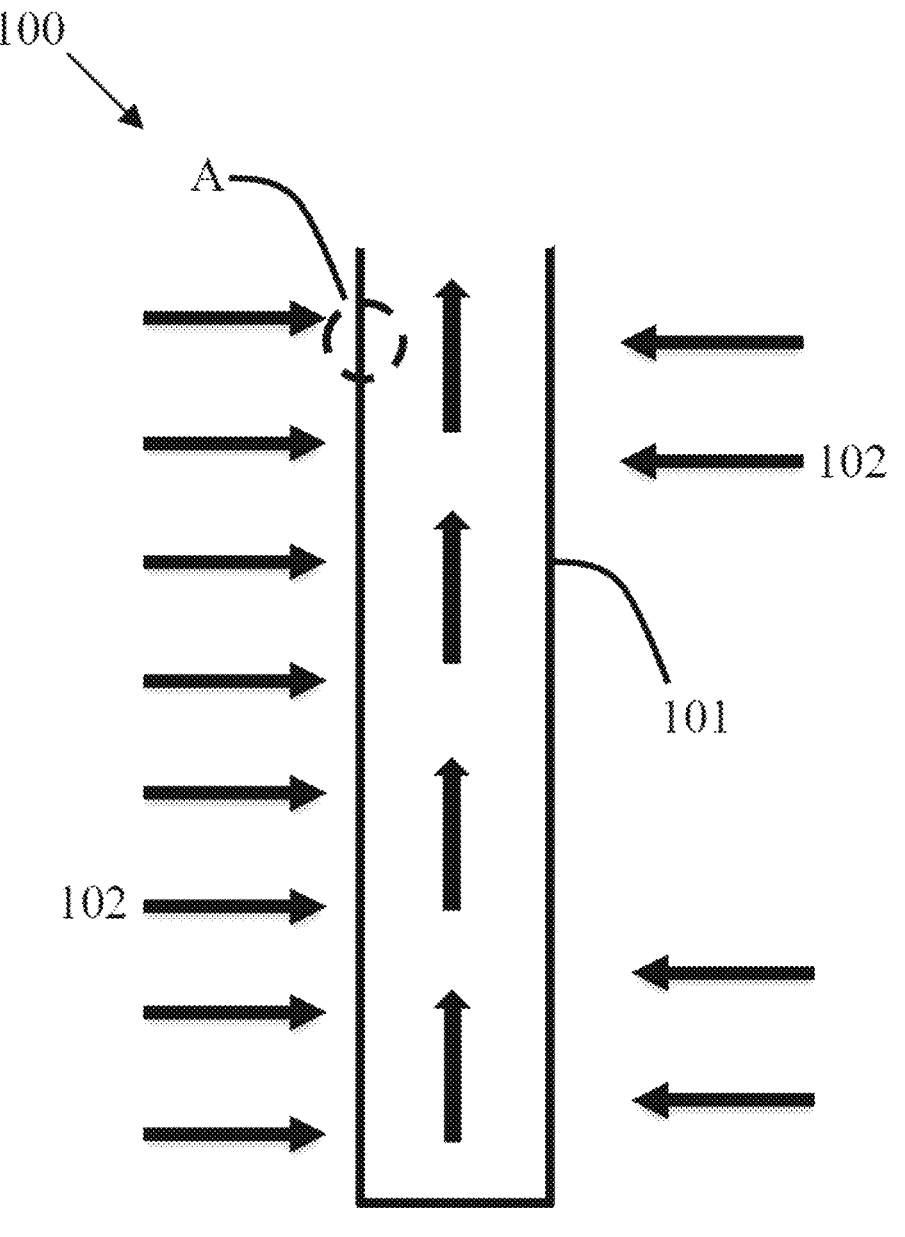
FIGS. 1A-1D depict embodiments of an exemplary filter medium according to the present disclosure.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "flow through" means that a flue gas stream is flowed transverse to a cross section of the at least one filter medium, such that the flue gas stream passes through a cross section of the at least one filter medium. In some embodiments of a "flow through" configuration, the flue gas stream is flowed perpendicular to a cross-section of the at least one filter medium.

As used herein, the term "flow by" means that the flue gas stream is not flowed transverse to a cross section of the at least one filter medium, such that the flue gas does not pass through the cross section of the at least one filter medium. In some embodiments of a "flow by" configuration, the flue gas stream is flowed parallel to a cross-section of the at least one filter medium.

As used herein "upstream" refers to a location of a flue gas stream before entering a filter medium. In the "flow through" context, "upstream" may refer to the location of a flue gas stream before entering a cross section of a filter medium. In the "flow by" context, "upstream" may refer to the location of a flue gas stream before entering an enclosure (e.g., a housing, a filter bag, or other suitable enclosure described herein) that contains a filter medium.

As used herein "downstream" refers to a location of a flue gas stream after exiting a filter medium. In the "flow through" context, "downstream" may refer to the location of a flue gas stream after exiting a cross section of a filter medium. In the "flow by" context, "downstream" may refer to the location of a flue gas stream after exiting an enclosure (e.g., a housing, a filter bag, or other suitable enclosure described herein) that contains a filter medium.

As used herein, the term "$NO_x$ compound" refers to any oxide of nitrogen. In some non-limiting embodiments, "$NO_x$ compound" may specifically refer to gaseous oxides of nitrogen that are known environmental pollutants.

As used herein, the term "catalytic composite article" set forth in the Examples refers to any material that includes a combination of at least one catalyst material and at least one additional material according to any embodiment described herein. The additional material is not limited to any particular type of material and may be, for example, a membrane, a felt batt, a ceramic substrate (including but not limited to a ceramic candle), a honeycomb substrate, a monolith substrate, or any combination thereof. The catalytic composite article may, in some non-limiting examples, be a porous catalytic film.

As used herein, the term "$NO_x$ removal efficiency" (also, "DeNO$_x$ efficiency") set forth in the Examples refers to a percentage value determined (e.g., calculated) according to the following algorithm:

$$NO_x \text{ removal efficiency ("DeNO}_x \text{ efficiency") (\%)}= (NO_{x\ in}-NO_{x\ out})/NO_{x\ in}\times100\%$$

Some embodiments of the present disclosure relate to a method of regenerating at least one filter medium.

In some embodiments, the at least one filter medium comprises at least one catalyst material. In some embodiments, the at least one catalyst material comprises at least one of: Vanadium Monoxide (VO), Vanadium Trioxide ($V_2O_3$), Vanadium Dioxide ($VO_2$), Vanadium Pentoxide ($V_2O_5$), Tungsten Trioxide ($WO_3$), Molybdenum Trioxide ($MoO_3$), Titanium Dioxide ($TiO_2$), Silicon Dioxide ($SiO_2$), Aluminum Trioxide ($Al_2O_3$), Manganese Oxide ($MnO_2$), zeolites, or any combination thereof. In some embodiments, the at least one catalyst material is in the form of catalyst particles.

In some embodiments, the at least one filter medium comprises an upstream side and a downstream side. In some embodiments, the at least one filter medium is disposed within at least one filter bag. In some embodiments, a plurality of filter mediums is disposed within a single filter bag. In some embodiments, the at least one filter bag is housed within at least one filter bag housing. In some embodiments, a plurality of filter bags is disposed within a single filter bag housing.

In some embodiments, the one filter medium comprises a porous protective layer and a porous catalytic layer. In some embodiments, the porous catalytic layer comprises at least one catalyst material. In some embodiments, the at least one catalyst material is disposed on the porous catalytic layer. In some embodiments, the at least one catalyst material is within (e.g., embedded within) the porous catalytic layer.

In some embodiments, the porous protective layer comprises a microporous layer. In some embodiments, the microporous layer comprises an expanded polytetrafluoroethylene (ePTFE) membrane.

In some embodiments, the at least one catalyst material is adhered to the filter medium by at least one adhesive. In some embodiments, the at least one catalyst material is adhered to the porous catalytic layer by at least one adhesive. In some exemplary embodiments, the at least one filter medium is in the form of a filter bag, such that the adherence of the at least one catalyst material to the porous catalytic layer by the at least one adhesive form a coated filter bag. In some embodiments, the at least one catalyst material is in the form of catalyst particles, such that the coated filter bag is coated with the catalyst particles.

In some embodiments, the at least one adhesive is chosen from polytetrafluoroethylene (PTFE), fluorinated ethylene propylene (FEP), high molecular weight polyethylene (HMWPE), high molecular weight polypropylene (HMWPP), perfluoroalkoxy alkane (PFA), polyvinylidene fluoride (PVDF), vinylidene fluoride (THV), chlorofluoroethylene (CFE), or any combination thereof. In some embodiments, the at least one adhesive is selected from the group consisting of polytetrafluoroethylene (PTFE), fluorinated ethylene propylene (FEP), high molecular weight polyethylene (HMWPE), high molecular weight polypropylene (HMWPP), perfluoroalkoxy alkane (PFA), polyvinylidene fluoride (PVDF), vinylidene fluoride (THV), chlorofluoroethylene (CFE), and any combination thereof.

In some embodiments, the porous catalytic layer comprises at least one polymeric substrate. In some embodiments, the at least one polymeric substrate comprises a least one of: polytetrafluorethylene, poly(ethylene-co-tetrafluoroethylene), ultra-high molecular weight polyethylene, polyparaxylylene, polylactic acid, polyimide, polyamide, polyaramid, polyphenylene sulfide, fiberglass, or any combination thereof. In some embodiments, the at least one polymeric substrate is selected from the group consisting of: polytetrafluorethylene, poly(ethylene-co-tetrafluoroethylene), ultra-high molecular weight polyethylene, polyparaxylylene, polylactic acid, polyimide, polyamide, polyaramid, polyphenylene sulfide, fiberglass, and any combination thereof.

In some embodiments, the porous catalytic layer includes at least one ceramic substrate. In some embodiments, the at least one ceramic substrate is in the form of a ceramic candle described herein. In some embodiments, the one ceramic substrate comprises ceramicfibers. In some embodiments, the ceramicfibers comprise alkali metal silicates, alkaline earth metal silicates, aluminosilicates, or any combination thereof.

In some embodiments, the porous catalytic layer is in the form of a layered assembly comprising a porous catalytic film and one or more felt batts. In some embodiments, the one or more felt batts are positioned on at least one side of the porous catalytic film. In some embodiments, the porous catalytic film comprises the at least one catalyst material. In some embodiments, the at least one catalyst material is disposed on the porous catalytic film. In some embodiments, the at least one catalyst material is within (e.g., embedded within) the porous catalytic film.

In some embodiments, the one or more felt batts comprise at least one of: a polytetrafluoroethylene (PTFE) felt, a PTFE fleece, an expanded polytetrafluoroethylene (ePTFE) felt, an ePTFE fleece, a woven fluoropolymer staple fiber, a nonwoven fluoropolymer staple fiber, or any combination thereof.

In some embodiments, the one or more felt batts are selected from the group consisting of: a polytetrafluoroethylene (PTFE) felt, a PTFE fleece, an expanded polytetrafluoroethylene (ePTFE) felt, an ePTFE fleece, a woven fluoropolymer staple fiber, a nonwoven fluoropolymer staple fiber, and any combination thereof.

In some embodiments, the porous catalytic film comprises a membrane. In some embodiments, the porous catalytic film comprises a polymer membrane. In some embodiments, the porous catalytic film comprises a fluoropolymer membrane and may be referred to as a porous catalytic fluoropolymer film. In some embodiments, the porous catalytic film comprises an expanded polytetrafluoroethylene (ePTFE) membrane.

In some embodiments, the porous catalytic film comprises catalyst particles enmeshed within the ePTFE membrane. In some embodiments, the ePTFE membrane has a microstructure that includes nodes, fibrils, or any combination thereof. In some embodiments, the catalyst particles may be enmeshed into the microstructure. In some embodiments, the catalyst particles may be enmeshed into the nodes. In some embodiments, the catalyst particles may be enmeshed into the fibrils. In some embodiments, the catalyst particles may be enmeshed into the nodes and fibrils.

In some embodiments, the at least one filter medium is in the form of a ceramic candle. In some embodiments, the ceramic candle comprises at least one ceramic material. In some embodiments, the least one ceramic material is chosen from: silica-aluminate, calcium-magnesium-silicate, calcium-silicate fibers, or any combination thereof. In some embodiments, catalyst particles form a coating on the at least one ceramic material.

In some embodiments, the at least one filter medium may comprise any material configured to capture at least one of solid particulates, liquid aerosols, or any combination thereof from a flue gas stream. In some embodiments, the at least one filter medium is in the form of at least one of: a filter bag, a honeycomb, a monolith or any combination thereof.

In some embodiments, the at least filter medium comprises ammonium bisulfate (ABS) deposits, ammonium sulfate (AS) deposits, or any combination thereof. In some embodiments, ABS deposits are disposed on the at least one catalyst material of the at least one filter medium. In some embodiments, ABS deposits are disposed within the at least one catalyst material of the at least one filter medium.

In some embodiments, the ABS deposits are present in a concentration ranging from 0.01% to 99% by mass of the at least one filter medium during the providing step. In some embodiments, the ABS deposits are present in a concentration ranging from 0.1% to 99% by mass of the at least one filter medium during the providing step. In some embodiments, the ABS deposits are present in a concentration ranging from 1% to 99% by mass of the at least one filter medium during the providing step. In some embodiments, the ABS deposits are present in a concentration ranging from 10% to 99% by mass of the at least one filter medium during the providing step. In some embodiments, the ABS deposits are present in a concentration ranging from 25% to 99% by mass of the at least one filter medium during the providing step. In some embodiments, the ABS deposits are present in a concentration ranging from 50% to 99% by mass of the at least one filter medium during the providing step. In some embodiments, the ABS deposits are present in a concentration ranging from 75% to 99% by mass of the at least one filter medium during the providing step. In some embodiments, the ABS deposits are present in a concentration ranging from 95% to 99% by mass of the at least one filter medium during the providing step.

In some embodiments, the ABS deposits are present in a concentration ranging from 0.01% to 95% by mass of the at least one filter medium during the providing step. In some embodiments, the ABS deposits are present in a concentration ranging from 0.01% to 75% by mass of the at least one filter medium during the providing step. In some embodiments, the ABS deposits are present in a concentration ranging from 0.01% to 50% by mass of the at least one filter medium during the providing step. In some embodiments, the ABS deposits are present in a concentration ranging from 0.01% to 25% by mass of the at least one filter medium during the providing step. In some embodiments, the ABS deposits are present in a concentration ranging from 0.01% to 10% by mass of the at least one filter medium during the providing step. In some embodiments, the ABS deposits are present in a concentration ranging from 0.01% to 1% by mass of the at least one filter medium during the providing step. In some embodiments, the ABS deposits are present in a concentration ranging from 0.01% to 0.1% by mass of the at least one filter medium during the providing step.

In some embodiments, the ABS deposits are present in a concentration ranging from 0.1% to 95% by mass of the at least one filter medium during the providing step. In some embodiments, the ABS deposits are present in a concentration ranging from 1% to 75% by mass of the at least one filter medium during the providing step. In some embodiments, the ABS deposits are present in a concentration ranging from 10% to 50% by mass of the at least one filter medium during the providing step.

In some embodiments, the method of regenerating at least one filter medium comprises flowing a flue gas stream through the at least one filter medium (i.e., transverse to a cross-section of the at least one filter medium), such that the flue gas stream passes through the cross section of the at least one filter medium. In some embodiments, the flue gas stream is flowed from an upstream side to a downstream side of the at least one filter medium. In some embodiments, the flue gas stream is flowed perpendicular to a cross-section of the at least one filter medium.

In some embodiments, the method of regenerating at least one filter medium comprises flowing a flue gas stream by the at least one filter medium (i.e., non-transverse to a cross-section of the at least one filter medium), such that the flue gas stream does not pass through the cross section of the at least one filter medium. In some embodiments, the flue gas stream is flowed parallel to a cross-section of the at least one filter medium.

In some embodiments, the flue gas stream comprises $NO_x$ compounds. In some embodiments, the $NO_x$ compounds comprise Nitric Oxide (NO) and Nitrogen Dioxide ($NO_2$). In some embodiments, the flue gas stream further comprises at least one of Oxygen ($O_2$), Water ($H_2O$), Nitrogen ($N_2$), Carbon Monoxide (CO), Sulfur Dioxide ($SO_2$), Sulfur Trioxide ($SO_3$), one or more hydrocarbons, or any combination thereof.

In some embodiments, the method of regenerating the at least one filter medium comprises increasing $NO_x$ removal efficiency of the at least one filter medium.

In some embodiments, the flue gas stream is at a first temperature during the flowing of the flue gas stream, such that increasing $NO_x$ removal efficiency of the at least one filter medium comprises increasing the temperature of the flue gas stream from the first temperature to a second temperature that exceeds the first temperature.

In some embodiments, the first temperature ranges from 180° C. to 230° C. In some embodiments, the first temperature ranges from 190° C. to 230° C. In some embodiments, the first temperature ranges from 200° C. to 230° C. In some embodiments, the first temperature ranges from 210° C. to 230° C. In some embodiments, the first temperature ranges from 220° C. to 230° C.

In some embodiments, the first temperature ranges from 180° C. to 220° C. In some embodiments, the first temperature ranges from 180° C. to 210° C. In some embodiments, the first temperature ranges from 180° C. to 200° C. In some embodiments, the first temperature ranges from 180° C. to 190° C.

In some embodiments, the first temperature ranges from 190° C. to 220° C. In some embodiments, the first temperature ranges from 200° C. to 210° C.

In some embodiments, the second temperature is at least 10° C. higher than the first temperature. In some embodiments, the second temperature is at least 20° C. higher than the first temperature. In some embodiments, the second temperature is at least 30° C. higher than the first temperature. In some embodiments, the second temperature is at least 40° C. higher than the first temperature. In some embodiments, the second temperature is at least 50° C. higher than the first temperature. In some embodiments, the second temperature is at least 60° C. higher than the first temperature. In some embodiments, the second temperature is at least 70° C. higher than the first temperature. In some embodiments, the second temperature is at least 80° C. higher than the first temperature. In some embodiments, the second temperature is at least 90° C. higher than the first temperature. In some embodiments, the second temperature is at least 100° C. higher than the first temperature.

In some embodiments, the second temperature is 10° C. to 100° C. higher than the first temperature. In some embodiments, the second temperature is 20° C. to 100° C. higher than the first temperature. In some embodiments, the second temperature is 30° C. to 100° C. higher than the first temperature. In some embodiments, the second temperature is 40° C. to 100° C. higher than the first temperature. In some embodiments, the second temperature is 50° C. to 100° C. higher than the first temperature. In some embodiments, the second temperature is 60° C. to 100° C. higher than the first temperature. In some embodiments, the second temperature is 70° C. to 100° C. higher than the first temperature. In some embodiments, the second temperature is 80° C. to 100° C. higher than the first temperature. In some embodiments, the second temperature is 90° C. to 100° C. higher than the first temperature.

In some embodiments, the second temperature is 10° C. to 90° C. higher than the first temperature. In some embodiments, the second temperature is 10° C. to 80° C. higher than the first temperature. In some embodiments, the second temperature is 10° C. to 70° C. higher than the first temperature. In some embodiments, the second temperature is 10° C. to 60° C. higher than the first temperature. In some embodiments, the second temperature is 10° C. to 50° C. higher than the first temperature. In some embodiments, the second temperature is 10° C. to 40° C. higher than the first temperature. In some embodiments, the second temperature is 10° C. to 30° C. higher than the first temperature. In some embodiments, the second temperature is 10° C. to 20° C. higher than the first temperature.

In some embodiments, the second temperature is 20° C. to 90° C. higher than the first temperature. In some embodiments, the second temperature is 30° C. to 80° C. higher than the first temperature. In some embodiments, the second temperature is 40° C. to 70° C. higher than the first temperature. In some embodiments, the second temperature is 50° C. to 60° C. higher than the first temperature.

In some embodiments, the second temperature is at least 240° C. In some embodiments, the second temperature is at least 245° C. In some embodiments, the second temperature is at least 250° C. In some embodiments, the second temperature is at least 255° C. In some embodiments, the second temperature is at least 260° C. In some embodiments, the second temperature is at least 265° C. In some embodiments, the second temperature is at least 270° C. In some embodiments, the second temperature is at least 275° C. In some embodiments, the second temperature is at least 280° C.

In some embodiments, the second temperature is at most 280° C. In some embodiments, the second temperature is at most 275° C. In some embodiments, the second temperature is at most 270° C. In some embodiments, the second temperature is at most 265° C. In some embodiments, the second temperature is at most 260° C. In some embodiments, the second temperature is at most 255° C. In some embodiments, the second temperature is at most 250° C. In some embodiments, the second temperature is at most 245° C. In some embodiments, the second temperature is at most 240° C.

In some embodiments, the second temperature ranges from 240° C. to 280° C. In some embodiments, the second temperature ranges from 240° C. to 275° C. In some embodiments, the second temperature ranges from 240° C. to 270° C. In some embodiments, the second temperature ranges from 240° C. to 265° C. In some embodiments, the second temperature ranges from 240° C. to 260° C. In some embodiments, the second temperature ranges from 240° C. to 255° C. In some embodiments, the second temperature ranges from 240° C. to 250° C. In some embodiments, the second temperature ranges from 240° C. to 245° C.

In some embodiments, the second temperature ranges from 240° C. to 275° C. In some embodiments, the second temperature ranges from 240° C. to 270° C. In some embodiments, the second temperature ranges from 240° C. to 265° C. In some embodiments, the second temperature ranges from 240° C. to 260° C. In some embodiments, the second temperature ranges from 240° C. to 255° C. In some embodiments, the second temperature ranges from 240° C. to 250° C. In some embodiments, the second temperature ranges from 240° C. to 245° C.

In some embodiments, the second temperature ranges from 245° C. to 275° C. In some embodiments, the second temperature ranges from 250° C. to 270° C. In some embodiments, the second temperature ranges from 255° C. to 265° C.

In some embodiments, the first temperature is increased to the second temperature for a duration of 0.25 hours to 48 hours. In some embodiments, the first temperature is increased to the second temperature for a duration of 0.5 hours to 48 hours. In some embodiments, the first temperature is increased to the second temperature for a duration of 1 hour to 48 hours. In some embodiments, the first temperature is increased to the second temperature for a duration of 2 hours to 48 hours. In some embodiments, the first temperature is increased to the second temperature for a duration of 5 hours to 48 hours. In some embodiments, the first temperature is increased to the second temperature for a duration of 10 hours to 48 hours. In some embodiments, the first temperature is increased to the second temperature for a duration of 12 hours to 48 hours. In some embodiments, the first temperature is increased to the second temperature for a duration of 24 hours to 48 hours. In some embodiments, the first temperature is increased to the second temperature fora duration of 36 hours to 48 hours.

In some embodiments, the first temperature is increased to the second temperature for a duration of 0.25 hours to 36 hours. In some embodiments, the first temperature is increased to the second temperature for a duration of 0.25 hours to 24 hours. In some embodiments, the first temperature is increased to the second temperature for a duration of 0.25 hours to 12 hours. In some embodiments, the first temperature is increased to the second temperature for a duration of 0.25 hours to 10 hours. In some embodiments, the first temperature is increased to the second temperature for a duration of 0.25 hours to 5 hours. In some embodiments, the first temperature is increased to the second temperature for a duration of 0.25 hours to 2 hours. In some embodiments, the first temperature is increased to the second temperature for a duration of 0.25 hours to 1 hour. In some embodiments, the first temperature is increased to the second temperature for a duration of 0.25 hours to 0.5 hours.

In some embodiments, the first temperature is increased to the second temperature for a duration of 0.5 hours to 36 hours. In some embodiments, the first temperature is increased to the second temperature for a duration of 1 hour to 24 hours. In some embodiments, the first temperature is increased to the second temperature for a duration of 2 hours to 12 hours. In some embodiments, the first temperature is increased to the second temperature for a duration of 5 hours to 10 hours.

In some embodiments, the increasing of the $NO_x$ removal efficiency of the at least one filter medium further comprises adding ammonia ($NH_3$) in a concentration ranging from 0.0001% to 0.5% of the concentration of the flue gas stream. In some embodiments, the increasing of the $NO_x$ removal efficiency of the at least one filter medium further comprises adding $NH_3$ in a concentration ranging from 0.001% to 0.5% of the concentration of the flue gas stream. In some embodiments, the increasing of the $NO_x$ removal efficiency of the at least one filter medium further comprises adding ammonia $NH_3$ in a concentration ranging from 0.01% to 0.5% of the concentration of the flue gas stream. In some embodiments, the increasing of the $NO_x$ removal efficiency of the at least one filter medium further comprises adding ammonia $NH_3$ in a concentration ranging from 0.1% to 0.5% of the concentration of the flue gas stream.

In some embodiments, the increasing of the $NO_x$ removal efficiency of the at least one filter medium further comprises adding $NH_3$ in a concentration ranging from 0.0001% to 0.1% of the concentration of the flue gas stream. In some embodiments, the increasing of the $NO_x$ removal efficiency of the at least one filter medium further comprises adding $NH_3$ in a concentration ranging from 0.0001% to 0.05% of the concentration of the flue gas stream. In some embodiments, the increasing of the $NO_x$ removal efficiency of the at least one filter medium further comprises adding $NH_3$ in a concentration ranging from 0.0001% to 0.005% of the concentration of the flue gas stream.

In some embodiments, the increasing of the $NO_x$ removal efficiency of the at least one filter medium further comprises adding $NH_3$ in a concentration ranging from 0.005% to 0.1% of the concentration of the flue gas stream. In some embodiments, the increasing of the $NO_x$ removal efficiency of the at least one filter medium further comprises adding $NH_3$ in a concentration ranging from 0.005% to 0.05% of the concentration of the flue gas stream.

In some embodiments, while the temperature of the flue gas stream is increased from the first temperature to a second temperature that exceeds the first temperature, $NH_3$ is added in a 1:100 to 5:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:50 to 5:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:25 to 5:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:10 to 5:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:5 to 5:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:2 to 5:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:1 to 5:1 concentration ratio based on a concentration of $NO_x$ compounds in the flue gas stream.

In some embodiments, while the temperature of the flue gas stream is increased from the first temperature to a second temperature that exceeds the first temperature, $NH_3$ is added in a 1:100 to 2:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:100 to 1:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:100 to 1:2 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:100 to 1:5 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:100 to 1:10 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:100 to 1:50 concentration ratio based on a concentration of $NO_x$ compounds in the flue gas stream.

In some embodiments, while the temperature of the flue gas stream is increased from the first temperature to a second temperature that exceeds the first temperature, $NH_3$ is added in a 1:50 to 2:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:25 to 1:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:10 to 1:2 concentration ratio based on a concentration of $NO_x$ compounds in the flue gas stream.

In some embodiments, the $NO_x$ removal efficiency is increased without any $NH_3$ being present in the flue gas stream. In some embodiments, the first temperature is increased to the second temperature without any $NH_3$ being added to the flue gas stream.

In some embodiments, the $NO_x$ removal efficiency of the at least one filter medium is at least 0.5% higher after the increasing step than during the providing step. In some embodiments, the $NO_x$ removal efficiency of the at least one filter medium is at least 1% higher after the increasing step than during the providing step. In some embodiments, the $NO_x$ removal efficiency of the at least one filter medium is at least 5% higher after the increasing step than during the providing step. In some embodiments, the $NO_x$ removal efficiency of the at least one filter medium is at least 10% higher after the increasing step than during the providing step. In some embodiments, the $NO_x$ removal efficiency of the at least one filter medium is at least 25% higher after the increasing step than during the providing step. In some embodiments, the $NO_x$ removal efficiency of the at least one filter medium is at least 50% higher after the increasing step than during the providing step. In some embodiments, the $NO_x$ removal efficiency of the at least one filter medium is at least 75% higher after the increasing step than during the providing step. In some embodiments, the $NO_x$ removal efficiency of the at least one filter medium is at least 100% higher after the increasing step than during the providing step.

In some embodiments, the increasing of the $NO_x$ removal efficiency comprises removing at least some of the ABS deposits, the AS deposits, or any combination thereof, from the at least one filter medium. In some embodiments, the increasing of the $NO_x$ removal efficiency comprises removing at least 10% of the ABS deposits, the AS deposits, or any combination thereof, from the at least one filter medium. In some embodiments, the increasing of the $NO_x$ removal efficiency comprises removing at least 25% of the ABS deposits, the AS deposits, or any combination thereof, from the at least one filter medium. In some embodiments, the increasing of the $NO_x$ removal efficiency comprises removing at least 50% of the ABS deposits, the AS deposits, or any combination thereof, from the at least one filter medium. In some embodiments, the increasing of the $NO_x$ removal efficiency comprises removing at least 75% of the ABS deposits, the AS deposits, or any combination thereof, from the at least one filter medium. In some embodiments, the increasing of the $NO_x$ removal efficiency comprises removing at least 95% of the ABS deposits, the AS deposits, or any combination thereof, from the at least one filter medium. In some embodiments, the increasing of the $NO_x$ removal efficiency comprises removing all of the ABS deposits, the AS deposits, or any combination thereof, from the at least one filter medium.

In some embodiments, after the increasing step, ABS deposits are disposed on the catalyst material of the at least one filter medium in a concentration ranging from 0.01% to 98% by mass of the at least one filter medium. In some embodiments, after the increasing step, ABS deposits are disposed on the catalyst material of the at least one filter medium in a concentration ranging from 0.01% to 90% by mass of the at least one filter medium. In some embodiments, after the increasing step, ABS deposits are disposed on the catalyst material of the at least one filter medium in a concentration ranging from 0.01% to 50% by mass of the at least one filter medium. In some embodiments, after the increasing step, ABS deposits are disposed on the catalyst material of the at least one filter medium in a concentration ranging from 0.01% to 20% by mass of the at least one filter medium. In some embodiments, after the increasing step, ABS deposits are disposed on the catalyst material of the at least one filter medium in a concentration ranging from 0.01% to 10% by mass of the at least one filter medium. In some embodiments, after the increasing step, ABS deposits are disposed on the catalyst material of the at least one filter medium in a concentration ranging from 0.01% to 5% by mass of the at least one filter medium. In some embodiments, after the increasing step, ABS deposits are disposed on the catalyst material of the at least one filter medium in a concentration ranging from 0.01% to 1% by mass of the at least one filter medium. In some embodiments, after the increasing step, ABS deposits are disposed on the catalyst material of the at least one filter medium in a concentration ranging from 0.01% to 0.1% by mass of the at least one filter medium.

In some embodiments, after the increasing step, ABS deposits are disposed on the catalyst material of the at least one filter medium in a concentration ranging from 0.1% to 98% by mass of the at least one filter medium. In some embodiments, after the increasing step, ABS deposits are disposed on the catalyst material of the at least one filter medium in a concentration ranging from 1% to 98% by mass of the at least one filter medium. In some embodiments, after the increasing step, ABS deposits are disposed on the catalyst material of the at least one filter medium in a concentration ranging from 5% to 98% by mass of the at least one filter medium. In some embodiments, after the increasing step, ABS deposits are disposed on the catalyst material of the at least one filter medium in a concentration ranging from 10% to 98% by mass of the at least one filter medium. In some embodiments, after the increasing step, ABS deposits are disposed on the catalyst material of the at least one filter medium in a concentration ranging from 20% to 98% by mass of the at least one filter medium. In some embodiments, after the increasing step, ABS deposits are disposed on the catalyst material of the at least one filter medium in a concentration ranging from 50% to 98% by mass of the at least one filter medium. In some embodiments, after the increasing step, ABS deposits are disposed on the catalyst material of the at least one filter medium in a concentration ranging from 90% to 98% by mass of the at least one filter medium.

In some embodiments, after the increasing step, ABS deposits are disposed on the catalyst material of the at least one filter medium in a concentration ranging from 0.1% to 90% by mass of the at least one filter medium. In some embodiments, after the increasing step, ABS deposits are disposed on the catalyst material of the at least one filter medium in a concentration ranging from 1% to 50% by mass of the at least one filter medium. In some embodiments, after the increasing step, ABS deposits are disposed on the catalyst material of the at least one filter medium in a concentration ranging from 5% to 20% by mass of the at least one filter medium.

In some embodiments, a concentration of $SO_2$ in the flue gas stream does not exceed 1000 ppm during the step of increasing the $NO_x$ removal efficiency of the at least one filter medium. In some embodiments, a concentration of $SO_2$ in the flue gas stream does not exceed 500 ppm during the step of increasing the $NO_x$ removal efficiency of the at least one filter medium. In some embodiments, a concentration of $SO_2$ in the flue gas stream does not exceed 250 ppm during the step of increasing the $NO_x$ removal efficiency of the at least one filter medium. In some embodiments, a concentration of $SO_2$ in the flue gas stream does not exceed 100 ppm during the step of increasing the $NO_x$ removal efficiency of the at least one filter medium. In some embodiments, a concentration of $SO_2$ in the flue gas stream does not exceed 75 ppm during the step of increasing the $NO_x$ removal efficiency of the at least one filter medium. In some embodiments, a concentration of $SO_2$ in the flue gas stream does not exceed 50 ppm during the step of increasing the $NO_x$ removal efficiency of the at least one filter medium. In some embodiments, a concentration of $SO_2$ in the flue gas stream does not exceed 25 ppm during the step of increasing the $NO_x$ removal efficiency of the at least one filter medium. In some embodiments, a concentration of $SO_2$ in the flue gas stream does not exceed 12 ppm during the step of increasing the $NO_x$ removal efficiency of the at least one filter medium. In some embodiments, a concentration of $SO_2$ in the flue gas stream does not exceed 10 ppm during the step of increasing the $NO_x$ removal efficiency of the at least one filter medium. In some embodiments, a concentration of $SO_2$ in the flue gas stream does not exceed 5 ppm during the step of increasing the $NO_x$ removal efficiency of the at least one filter medium. In some embodiments, a concentration of $SO_2$ in the flue gas stream does not exceed 2 ppm during the step of increasing the $NO_x$ removal efficiency of the at least one filter medium. In some embodiments, a concentration of $SO_2$ in the flue gas stream does not exceed 1 ppm during the step of increasing the $NO_x$ removal efficiency of the at least one filter medium.

Some embodiments of the present disclosure relate to a method of cleaning a flue gas stream. In some embodiments, the method of cleaning the flue gas stream may comprise flowing a flue gas stream through a filter medium as described herein, (i.e., transverse to a cross-section of a filter medium, such that the flue gas stream passes through the cross section of the at least one filter medium).

In some embodiments of the method of cleaning the flue gas stream, the flue gas stream may comprise $NO_x$ compounds. In some embodiments, the $NO_x$ compounds may comprise Nitric Oxide (NO), and Nitrogen Dioxide ($NO_2$). In some embodiments, the flue gas stream may further comprise Sulfur Dioxide ($SO_2$) and Ammonia ($NH_3$).

In some embodiments, the $SO_2$, $NH_3$, and $NO_x$ compounds are present in an amount of at least 1 $mg/m^3$ based on a total volume of the flue gas stream. In some embodiments, the $SO_2$, $NH_3$, and $NO_x$ compounds are present in an amount of at least 2 $mg/m^3$ based on a total volume of the flue gas stream. In some embodiments, the $SO_2$, $NH_3$, and $NO_x$ compounds are present in an amount of at least 5 $mg/m^3$ based on a total volume of the flue gas stream. In some embodiments, the $SO_2$, $NH_3$, and $NO_x$ compounds are present in an amount of at least 10 $mg/m^3$ based on a total volume of the flue gas stream. In some embodiments, the $SO_2$, $NH_3$, and $NO_x$ compounds are present in an amount of at least 25 $mg/m^3$ based on a total volume of the flue gas stream. In some embodiments, the $SO_2$, $NH_3$, and $NO_x$ compounds are present in an amount of at least 50 $mg/m^3$ based on a total volume of the flue gas stream. In some embodiments, the $SO_2$, $NH_3$, and $NO_x$ compounds are present in an amount of at least 100 $mg/m^3$ based on a total volume of the flue gas stream.

In some embodiments of the method of cleaning the flue gas stream, the method may include maintaining a constant $NO_x$ removal efficiency of the at least one filter medium. In some embodiments of the method of cleaning the flue gas stream, the method may include maintaining $NO_x$ removal efficiency of the at least one filter medium that does not vary by more than 1%. In some embodiments of the method of cleaning the flue gas stream, the method may include maintaining $NO_x$ removal efficiency of the at least one filter medium that does not vary by more than 5%. In some embodiments of the method of cleaning the flue gas stream, the method may include maintaining $NO_x$ removal efficiency of the at least one filter medium that does not vary by more than 10%.

In some embodiments, $NO_x$ efficiency is maintained in an amount of at least 70% of an initial $NO_x$ efficiency. In some embodiments, $NO_x$ efficiency is maintained in an amount of at least 75% of an initial $NO_x$ efficiency. In some embodiments, $NO_x$ efficiency is maintained in an amount of at least 80% of an initial $NO_x$ efficiency. In some embodiments, $NO_x$ efficiency is maintained in an amount of at least 85% of an initial $NO_x$ efficiency. In some embodiments, $NO_x$ efficiency is maintained in an amount of at least 90% of an initial $NO_x$ efficiency. In some embodiments, $NO_x$ efficiency is maintained in an amount of at least 95% of an initial $NO_x$ efficiency. In some embodiments, $NO_x$ efficiency is maintained in an amount of at least 99% of an initial $NO_x$ efficiency.

In some embodiments, the $NO_x$ removal efficiency of the at least one filter medium is maintained in a range of 70% to 99% of the initial $NO_x$ efficiency. In some embodiments, the $NO_x$ removal efficiency of the at least one filter medium is maintained in a range of 75% to 99% of the initial $NO_x$ efficiency. In some embodiments, the $NO_x$ removal efficiency of the at least one filter medium is maintained in a range of 80% to 99% of the initial $NO_x$ efficiency. In some embodiments, the $NO_x$ removal efficiency of the at least one filter medium is maintained in a range of 85% to 99% of the initial $NO_x$ efficiency. In some embodiments, the $NO_x$ removal efficiency of the at least one filter medium is maintained in a range of 90% to 99% of the initial $NO_x$ efficiency. In some embodiments, the $NO_x$ removal efficiency of the at least one filter medium is maintained in a range of 95% to 99% of the initial $NO_x$ efficiency.

In some embodiments, the $NO_x$ removal efficiency of the at least one filter medium is maintained in a range of 70% to 95% of the initial $NO_x$ efficiency. In some embodiments, the $NO_x$ removal efficiency of the at least one filter medium is maintained in a range of 70% to 90% of the initial $NO_x$ efficiency. In some embodiments, the $NO_x$ removal efficiency of the at least one filter medium is maintained in a range of 70% to 85% of the initial $NO_x$ efficiency. In some embodiments, the $NO_x$ removal efficiency of the at least one filter medium is maintained in a range of 70% to 80% of the initial $NO_x$ efficiency. In some embodiments, the $NO_x$ removal efficiency of the at least one filter medium is maintained in a range of 70% to 75% of the initial $NO_x$ efficiency.

In some embodiments, the $NO_x$ removal efficiency of the at least one filter medium is maintained in a range of 75% to 95% of the initial $NO_x$ efficiency. In some embodiments, the $NO_x$ removal efficiency of the at least one filter medium is maintained in a range of 80% to 90% of the initial $NO_x$ efficiency.

In some embodiments, a concentration of $SO_2$ in the flue gas stream does not exceed 1000 ppm during the step of maintaining the $NO_x$ removal efficiency (i.e., either as a percentage of an initial $NO_x$ efficiency, as a constant $NO_x$ efficiency, or a combination thereof) of the at least one filter medium. In some embodiments, a concentration of $SO_2$ in the flue gas stream does not exceed 500 ppm during the step of maintaining the $NO_x$ removal efficiency (i.e., either as a percentage of an initial $NO_x$ efficiency, as a constant $NO_x$ efficiency, or a combination thereof) of the at least one filter medium. In some embodiments, a concentration of $SO_2$ in the flue gas stream does not exceed 250 ppm during the step of maintaining the $NO_x$ removal efficiency (i.e., either as a percentage of an initial $NO_x$ efficiency, as a constant $NO_x$ efficiency, or a combination thereof) of the at least one filter medium. In some embodiments, a concentration of $SO_2$ in the flue gas stream does not exceed 100 ppm during the step of maintaining the $NO_x$ removal efficiency (i.e., either as a percentage of an initial $NO_x$ efficiency, as a constant $NO_x$ efficiency, or a combination thereof) of the at least one filter medium. In some embodiments, a concentration of $SO_2$ in the flue gas stream does not exceed 75 ppm during the step of maintaining the $NO_x$ removal efficiency of the at least one filter medium. In some embodiments, a concentration of $SO_2$ in the flue gas stream does not exceed 50 ppm during the step of maintaining the $NO_x$ removal efficiency of the at least one filter medium. In some embodiments, a concentration of $SO_2$ in the flue gas stream does not exceed 25 ppm during the step of maintaining the $NO_x$ removal efficiency of the at least one filter medium. In some embodiments, a concentration of $SO_2$ in the flue gas stream does not exceed 12 ppm during the step of maintaining the $NO_x$ removal efficiency of the at least one filter medium. In some embodiments, a concentration of $SO_2$ in the flue gas stream does not exceed 10 ppm during the step of maintaining the $NO_x$ removal efficiency of the at least one filter medium. In some embodiments, a concentration of $SO_2$ in the flue gas stream does not exceed 5 ppm during the step of maintaining the $NO_x$ removal efficiency of the at least one filter medium. In some embodiments, a concentration of $SO_2$ in the flue gas stream does not exceed 2 ppm during the step of maintaining the $NO_x$ removal efficiency of the at least one filter medium. In some embodiments, a concentration of $SO_2$ in the flue gas stream does not exceed 1 ppm during the step of maintaining the $NO_x$ removal efficiency of the at least one filter medium.

In some embodiments, the flue gas stream is at a first temperature during the flowing of the flue gas stream, such that the $NO_x$ efficiency is maintained (i.e., either as a percentage of an initial $NO_x$ efficiency, as a constant $NO_x$ efficiency, or a combination thereof) by increasing the temperature of the flue gas stream from the first temperature to a second temperature that exceeds the first temperature.

In some embodiments, the first temperature ranges from 180° C. to 230° C. In some embodiments, the first temperature ranges from 190° C. to 230° C. In some embodiments, the first temperature ranges from 200° C. to 230° C. In some embodiments, the first temperature ranges from 210° C. to 230° C. In some embodiments, the first temperature ranges from 220° C. to 230° C.

In some embodiments, the first temperature ranges from 180° C. to 220° C. In some embodiments, the first temperature ranges from 180° C. to 210° C. In some embodiments, the first temperature ranges from 180° C. to 200° C. In some embodiments, the first temperature ranges from 180° C. to 190° C.

In some embodiments, the first temperature ranges from 190° C. to 220° C. In some embodiments, the first temperature ranges from 200° C. to 210° C.

In some embodiments, the second temperature is at least 10° C. higher than the first temperature. In some embodiments, the second temperature is at least 20° C. higher than the first temperature. In some embodiments, the second temperature is at least 30° C. higher than the first temperature. In some embodiments, the second temperature is at least 40° C. higher than the first temperature. In some embodiments, the second temperature is at least 50° C. higher than the first temperature. In some embodiments, the second temperature is at least 60° C. higher than the first temperature. In some embodiments, the second temperature is at least 70° C. higher than the first temperature. In some embodiments, the second temperature is at least 80° C. higher than the first temperature. In some embodiments, the second temperature is at least 90° C. higher than the first temperature. In some embodiments, the second temperature is at least 100° C. higher than the first temperature.

In some embodiments, the second temperature is 10° C. to 100° C. higher than the first temperature. In some embodiments, the second temperature is 20° C. to 100° C. higher than the first temperature. In some embodiments, the second temperature is 30° C. to 100° C. higher than the first temperature. In some embodiments, the second temperature is 40° C. to 100° C. higher than the first temperature. In some embodiments, the second temperature is 50° C. to 100° C. higher than the first temperature. In some embodiments, the second temperature is 60° C. to 100° C. higher than the first temperature. In some embodiments, the second temperature is 70° C. to 100° C. higher than the first temperature. In some embodiments, the second temperature is 80° C. to 100° C. higher than the first temperature. In some embodiments, the second temperature is 90° C. to 100° C. higher than the first temperature.

In some embodiments, the second temperature is 10° C. to 90° C. higher than the first temperature. In some embodiments, the second temperature is 10° C. to 80° C. higher than the first temperature. In some embodiments, the second temperature is 10° C. to 70° C. higher than the first temperature. In some embodiments, the second temperature is 10° C. to 60° C. higher than the first temperature. In some embodiments, the second temperature is 10° C. to 50° C. higher than the first temperature. In some embodiments, the second temperature is 10° C. to 40° C. higher than the first temperature. In some embodiments, the second temperature is 10° C. to 30° C. higher than the first temperature. In some embodiments, the second temperature is 10° C. to 20° C. higher than the first temperature.

In some embodiments, the second temperature is 20° C. to 90° C. higher than the first temperature. In some embodiments, the second temperature is 30° C. to 80° C. higher than the first temperature. In some embodiments, the second temperature is 40° C. to 70° C. higher than the first temperature. In some embodiments, the second temperature is 50° C. to 60° C. higher than the first temperature.

In some embodiments, the second temperature is at least 240° C. In some embodiments, the second temperature is at least 245° C. In some embodiments, the second temperature is at least 250° C. In some embodiments, the second temperature is at least 255° C. In some embodiments, the second temperature is at least 260° C. In some embodiments, the second temperature is at least 265° C. In some embodiments, the second temperature is at least 270° C. In some embodiments, the second temperature is at least 275° C. In some embodiments, the second temperature is at least 280° C.

In some embodiments, the second temperature is at most 280° C. In some embodiments, the second temperature is at most 275° C. In some embodiments, the second temperature is at most 270° C. In some embodiments, the second temperature is at most 265° C. In some embodiments, the second temperature is at most 260° C. In some embodiments, the second temperature is at most 255° C. In some embodiments, the second temperature is at most 250° C. In some embodiments, the second temperature is at most 245° C. In some embodiments, the second temperature is at most 240° C.

In some embodiments, the second temperature ranges from 240° C. to 280° C. In some embodiments, the second temperature ranges from 240° C. to 275° C. In some embodiments, the second temperature ranges from 240° C. to 270° C. In some embodiments, the second temperature ranges from 240° C. to 265° C. In some embodiments, the second temperature ranges from 240° C. to 260° C. In some embodiments, the second temperature ranges from 240° C. to 255° C. In some embodiments, the second temperature ranges from 240° C. to 250° C. In some embodiments, the second temperature ranges from 240° C. to 245° C.

In some embodiments, the second temperature ranges from 240° C. to 275° C. In some embodiments, the second temperature ranges from 240° C. to 270° C. In some embodiments, the second temperature ranges from 240° C. to 265° C. In some embodiments, the second temperature ranges from 240° C. to 260° C. In some embodiments, the second temperature ranges from 240° C. to 255° C. In some embodiments, the second temperature ranges from 240° C. to 250° C. In some embodiments, the second temperature ranges from 240° C. to 245° C.

In some embodiments, the second temperature ranges from 245° C. to 275° C. In some embodiments, the second temperature ranges from 250° C. to 270° C. In some embodiments, the second temperature ranges from 255° C. to 265° C.

In some embodiments, while the temperature of the flue gas stream is increased from the first temperature to a second temperature that exceeds the first temperature, $NH_3$ is added in a 1:100 to 5:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:50 to 5:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:25 to 5:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:10 to 5:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:5 to 5:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:2 to 5:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:1 to 5:1 concentration ratio based on a concentration of $NO_x$ compounds in the flue gas stream.

In some embodiments, while the temperature of the flue gas stream is increased from the first temperature to a second temperature that exceeds the first temperature, $NH_3$ is added in a 1:100 to 2:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:100 to 1:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:100 to 1:2 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:100 to 1:5 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:100 to 1:10 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:100 to 1:50 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:50 to 2:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:25 to 1:1 concentration ratio based on a concentration of $NO_x$ compounds in the flue gas stream. In some embodiments, while the temperature of the flue gas stream is increased from the first temperature to a second temperature that exceeds the first temperature, $NH_3$ is added in a 1:10 to 1:2 concentration ratio based on a concentration of $NO_x$ compounds in the flue gas stream.

In some embodiments, the $NO_x$ removal efficiency is maintained without any $NH_3$ being present in the flue gas stream. In some embodiments, the first temperature is increased to the second temperature without any $NH_3$ being added to the flue gas stream.

In some embodiments, the first temperature is increased to the second temperature for a duration of 0.25 hours to 48 hours. In some embodiments, the first temperature is increased to the second temperature for a duration of 0.5 hours to 48 hours. In some embodiments, the first temperature is increased to the second temperature for a duration of 1 hour to 48 hours. In some embodiments, the first temperature is increased to the second temperature for a duration of 2 hours to 48 hours. In some embodiments, the first temperature is increased to the second temperature for a duration of 5 hours to 48 hours. In some embodiments, the first temperature is increased to the second temperature for a duration of 10 hours to 48 hours. In some embodiments, the first temperature is increased to the second temperature for a duration of 12 hours to 48 hours. In some embodiments, the first temperature is increased to the second temperature for a duration of 24 hours to 48 hours. In some embodiments, the first temperature is increased to the second temperature fora duration of 36 hours to 48 hours.

In some embodiments, the first temperature is increased to the second temperature for a duration of 0.25 hours to 36 hours. In some embodiments, the first temperature is increased to the second temperature for a duration of 0.25 hours to 24 hours. In some embodiments, the first temperature is increased to the second temperature for a duration of 0.25 hours to 12 hours. In some embodiments, the first temperature is increased to the second temperature for a duration of 0.25 hours to 10 hours. In some embodiments, the first temperature is increased to the second temperature for a duration of 0.25 hours to 5 hours. In some embodiments, the first temperature is increased to the second temperature for a duration of 0.25 hours to 2 hours. In some embodiments, the first temperature is increased to the second temperature for a duration of 0.25 hours to 1 hour. In some embodiments, the first temperature is increased to the second temperature for a duration of 0.25 hours to 0.5 hours.

In some embodiments, the first temperature is increased to the second temperature for a duration of 0.5 hours to 36 hours. In some embodiments, the first temperature is increased to the second temperature for a duration of 1 hour to 24 hours. In some embodiments, the first temperature is increased to the second temperature for a duration of 2 hours to 12 hours. In some embodiments, the first temperature is increased to the second temperature for a duration of 5 hours to 10 hours.

In some embodiments, the first temperature is increased to the second temperature increased periodically. In some embodiments, the first temperature is increased to the second temperature continuously.

In some embodiments, the periodic increasing occurs at constant time intervals. In some embodiments, the periodic increasing occurs at variable time intervals. In some embodiments, the periodic increasing occurs at random time intervals.

In some embodiments, the periodic increasing comprises increasing the first temperature to the second temperature fora predetermined duration (e.g., as mentioned above), and decreasing the second temperature to the first temperature after the predetermined duration. In some embodiments, the periodic increasing comprises performing the aforementioned steps cyclically.

In some embodiments, the periodic increasing comprises increasing the first temperature to the second temperature every 1 to 40,000 hours. In some embodiments, the periodic increasing comprises increasing the first temperature to the second temperature every 10 to 40,000 hours. In some embodiments, the periodic increasing comprises increasing the first temperature to the second temperature every 100 to 40,000 hours. In some embodiments, the periodic increasing comprises increasing the first temperature to the second temperature every 1,000 to 40,000 hours. In some embodiments, the periodic increasing comprises increasing the first temperature to the second temperature every 5,000 to 40,000 hours. In some embodiments, the periodic increasing comprises increasing the first temperature to the second temperature every 10,000 to 40,000 hours. In some embodiments, the periodic increasing comprises increasing the first temperature to the second temperature every 20,000 to 40,000 hours. In some embodiments, the periodic increasing comprises increasing the first temperature to the second temperature every 30,000 to 40,000 hours.

In some embodiments, the periodic increasing comprises increasing the first temperature to the second temperature every 1 to 30,000 hours. In some embodiments, the periodic increasing comprises increasing the first temperature to the second temperature every 1 to 20,000 hours. In some embodiments, the periodic increasing comprises increasing the first temperature to the second temperature every 1 to 10,000 hours. In some embodiments, the periodic increasing comprises increasing the first temperature to the second temperature every 1 to 5,000 hours. In some embodiments, the periodic increasing comprises increasing the first temperature to the second temperature every 1 to 1,000 hours. In some embodiments, the periodic increasing comprises increasing the first temperature to the second temperature every 1 to 100 hours. In some embodiments, the periodic increasing comprises increasing the first temperature to the second temperature every 1 to 10 hours.

In some embodiments, the periodic increasing comprises increasing the first temperature to the second temperature every 10 to 30,000 hours. In some embodiments, the periodic increasing comprises increasing the first temperature to the second temperature every 100 to 20,000 hours. In some embodiments, the periodic increasing comprises increasing the first temperature to the second temperature every 1,000 to 5,000 hours.

FIGS. 1A-1D depict embodiments of an exemplary filter medium according to the present disclosure.

Referring to FIG. 1A, at least one filter medium 101 may be housed in at least one filter bag 100. A flue gas stream 102 may flow through the at least one filter medium 101 by passing through cross section A. Once the flue gas stream 102 flows through the at least one filter medium 101, the flue gas stream 102 may flow by the at least one filter bag, as indicated by the vertically oriented arrows.

Figure 1B:
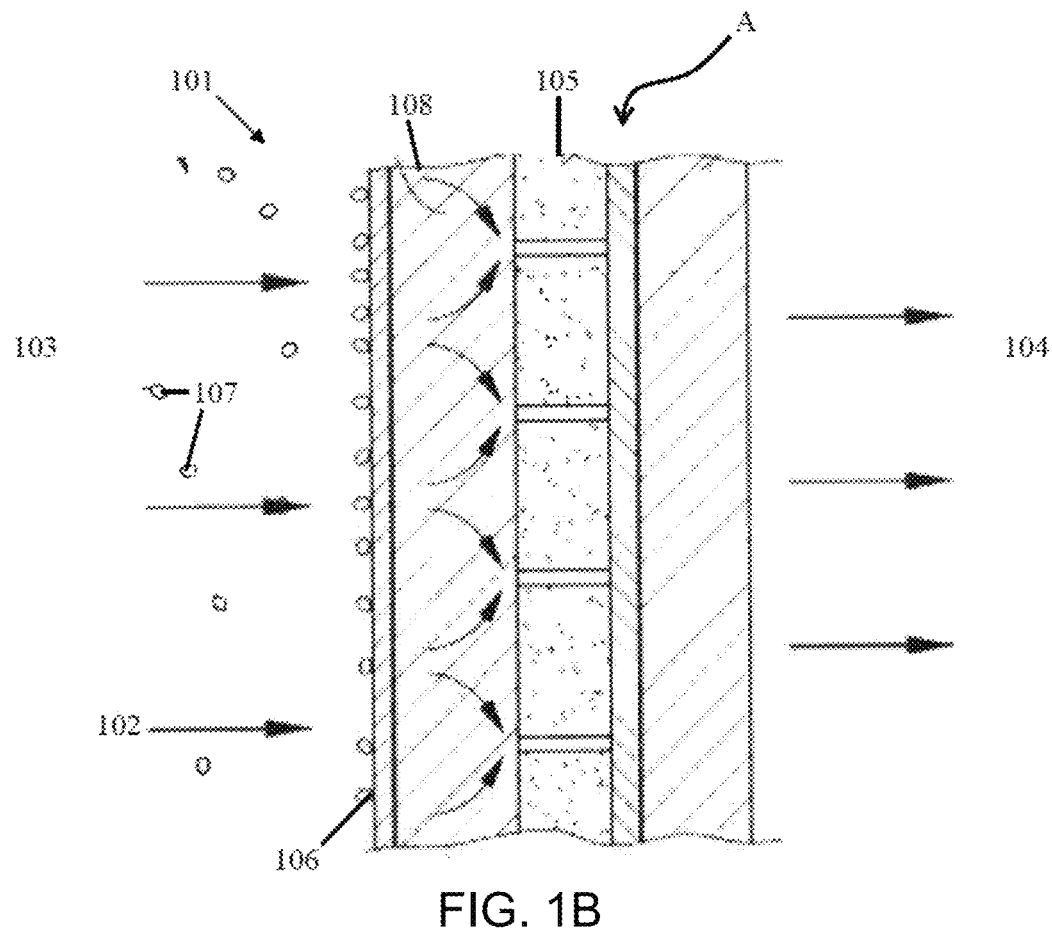

FIG. 1B depicts an exemplary filter medium 101 according to some embodiments of the present disclosure. As shown in FIG. 1B, a flue gas stream 102, which may comprise $NO_x$ compounds and solid particulates 107, may flow through cross section A from an upstream side 103 of the filter medium 101 to a downstream side 104 of the filter medium. While not shown, the upstream side 103 of the filter medium 101 may, in some embodiments, correspond to an outside of a filter bag, such as filter bag 100. Likewise, downstream side 104 of the filter medium 101 may correspond to an inside of a filter bag, such as filter bag 100. In some embodiments, filter medium 101 may include at least one protective membrane 106 and one or more felt batts 108 on at least one of: the upstream side 103 the of the filter medium 101, the downstream side 104 the of the filter medium 101, or any combination thereof. In some embodiments, the one or more felt batts 108 may be positioned on a porous catalytic film 105. In some embodiments, the combination of the one or more felt batts 108 and the porous catalytic film 105 may be referred to as a porous catalytic layer (not shown in FIG. 1B).

Figure 1C:
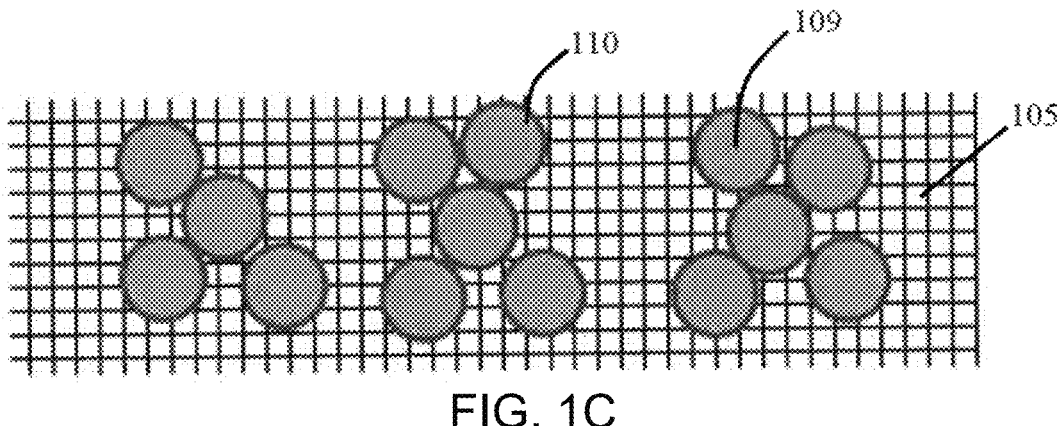

FIG. 1C depicts a non-limiting exemplary embodiment of the porous catalytic film 105. As shown, porous catalytic film 105 may include catalyst particles 109 on at least one surface of the porous catalytic film 105. ABS deposits 110 may be disposed on the surface of the catalyst particles 109.

Figure 1D:
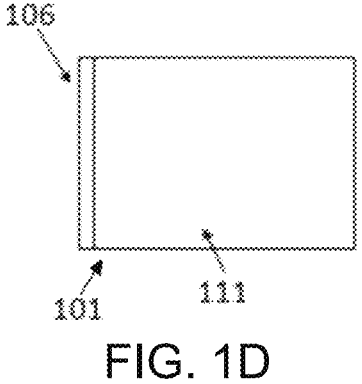

FIG. 1D depicts an additional non-limiting exemplary embodiment of a filter medium 101. As shown, filter medium 101 may comprise a porous catalytic layer 111. In some non-limiting embodiments, filter medium 101 may take the form of a filter bag. In some embodiments, the porous catalytic layer 111 may be coated with a catalyst material (not shown in FIG. 1D) such as catalyst particles. In some embodiments, the catalyst material may be attached to the porous catalytic layer 111 by one or more adhesives described herein (not shown). In some embodiments, the filter medium 101 may include a porous protective membrane 106.

EXAMPLES

Example 1: In-Situ "Flow-Through" Thermal Regeneration of Filter Medium Including Catalytic Filter Bags by NO, $NO_2$ and $NH_3$ Gas Mixture with Low Levels of $SO_2$ Four catalytic filter bags (65 mm in diameter, 1630 mm in length) were prepared from the catalytic composite articles described below.

A catalytic composite article was formed according to International Publication No. WO 2019/099025 to Eves et al. The filter medium included a catalytic composite article having a catalytic layered assembly that included a Polytetrafluoroethylene (PTFE)+catalyst composite membrane having a first, upstream side and a second, downstream side; and one or more felt batts. Each felt batt was formed of fleece formed from PTFE staple fiber. The filter medium was connected by a plurality of perforations formed by a needle punching process, by a needling process, or both.

The Polytetrafluoroethylene (PTFE)+catalyst composite membranes of the filter medium described above were prepared using the general dry blending methodology taught in U.S. Pat. No. 7,791,861 B2 to Zhong et al. to form composite tapes that were then uniaxially expanded according to the teachings of U.S. Pat. No. 3,953,556 to Gore. The resulting porous fibrillated expanded PTFE (ePTFE) composite membranes included supported catalyst particles durably enmeshed and immobilized with the ePTFE node and fibril matrix.

$NO_x$ reaction efficiency before ammonium bisulfate (ABS) deposition: The filter medium including the sample catalytic filter bags were tested for $NO_x$ removal efficiency at Innovative Combustion Technologies from a simulated flue gas at 230° C. The simulated flue gas contained 200 ppm NO, 1.5 ppm $NO_2$, 200 ppm $NH_3$, 10% $O_2$, 8% water moisture, and $N_2$ with a total flowrate of 23.3 standard cubic feet per minute (SCFM). In order to determine $NO_x$ removal efficiency, the upstream (i.e., the concentration of $NO_x$ entering into the chamber before exposure to the filter medium) and downstream concentration (i.e. the concentration of $NO_x$ exiting the chamber relative after exposure to the filter medium) of NO and $NO_2$ were monitored with a MKS MULTI-GAS™ 2030D FTIR analyzer (MKS Instruments, Andover, MA). $NO_x$ removal efficiency was calculated according to the following formula where '$NO_x$' indicates the total concentration of NO and $NO_2$ in the respective stream.

In-situ deposition of ammonium bisulfate (ABS): The filter medium including the sample catalytic filter bags in-situ fouled at Innovative combustion Technologies by 400 ppm NO, 440 ppm $NH_3$, 3000 ppm $SO_2$ and 8% water moisture at 230° C. for 4 hours with a total flowrate of 23.3 standard cubic feet per minute (SCFM).

$NO_x$ reaction efficiency after ammonium bisulfate (ABS) deposition: The $NO_x$ removal efficiency of catalytic filter bags after ABS deposition was tested for at Innovative Combustion Technologies from a simulated flue gas at 230° C., as described above. The simulated flue gas contained 200 ppm NO, 1.5 ppm $NO_2$, 200 ppm $NH_3$, 10% $O_2$, 8% water moisture, and $N_2$ with a total flowrate of 23.3 standard cubic feet per minute (SCFM).

In-situ "flow-through" thermal regeneration by NO, $NO_2$, $NH_3$ and $SO_2$ mixture: During an in-situ thermal regeneration, a filter medium including 4 catalytic filter bags in-situ fouled as described above were used. A gas mixture set to a $NH_3/NO_x$ ratio of 1.0, including 7 ppm $SO_2$; and also including 200 ppm NO, 1 ppm $NO_2$, 200 ppm $NH_3$, 10% $O_2$, 8% water moisture, and $N_2$ was first increased to 260° C. and set to flow-through the catalytic filter bags at 260° C. with a total flowrate of 22.0 SCFM for 8 hours.

$NO_x$ reaction efficiency after thermal regeneration: The $NO_x$ removal efficiency of catalytic filter bags after thermal regeneration was tested for at Innovative Combustion Technologies from a simulated flue gas at 230° C., as described above. The simulated flue gas contained 200 ppm NO, 1.5 ppm $NO_2$, 200 ppm $NH_3$, 10% $O_2$, 8% water moisture, and $N_2$ with a total flowrate of 23.3 standard cubic feet per minute (SCFM).

Figure 2:
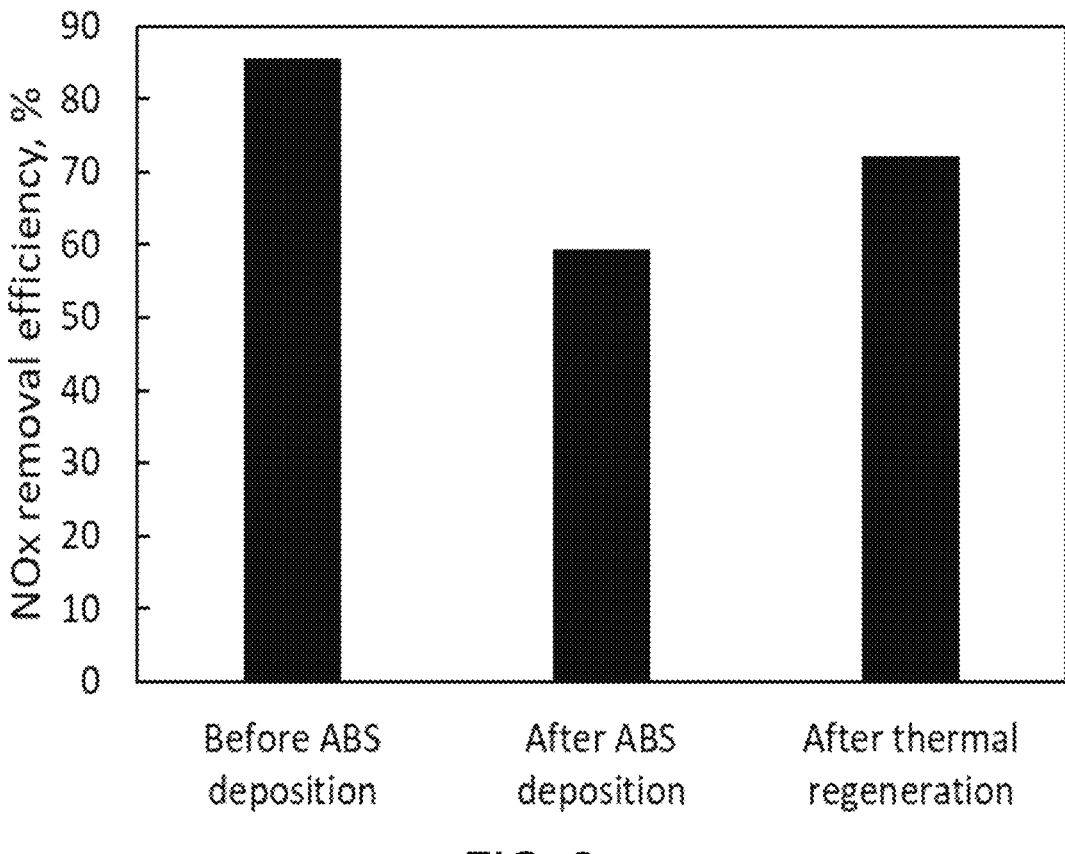
FIG. 2 depicts an exemplary $NO_x$ removal efficiency before ammonium bisulfate deposition, after ammonium bisulfate deposition, and after thermal regeneration of filter medium(s) described herein.

Results: FIG. 2 shows the $NO_x$ removal efficiencies for (1) Before ammonium bisulfate (ABS) deposition; (2) after ABS deposition; and (3) after thermal regeneration (by $NH_3/NO_x$=1.0, 7 ppm $SO_2$ mixture at 260° C.) on catalytic filter bags. FIG. 2 shows that the $NO_x$ removal efficiency before the ABS deposition is higher than the $NO_x$ removal efficiency after ABS deposition. FIG. 2 shows that the $NO_x$ removal efficiency after the thermal regeneration is higher than the $NO_x$ removal efficiency after ABS deposition. FIG. 2 also shows that the $NO_x$ removal efficiency before the ABS deposition is higher than the $NO_x$ removal efficiency after the thermal regeneration.

Example 2 (Comparative Example): In-Situ "Flow-Through" Thermal Regeneration of Filter Medium Including Catalytic Filter Bags by a NO, $NO_2$, $NH_3$ and $SO_2$ Gas Mixture with a Higher $SO_2$ Concentration For this Comparative Example, four catalytic filter bags (65 mm in diameter, 1630 mm in length) were prepared from the catalytic composite articles as described above in Example 1.

$NO_x$ reaction efficiency before ammonium bisulfate (ABS) deposition: The filter medium including the sample catalytic filter bags were tested for $NO_x$ removal efficiency at Innovative Combustion Technologies from a simulated flue gas at 230° C. The simulated flue gas contained 200 ppm NO, 1.5 ppm $NO_2$, 200 ppm $NH_3$, 10% $O_2$, 8% water moisture, and $N_2$ with a total flowrate of 23.3 standard cubic feet per minute (SCFM). In order to determine $NO_x$ removal efficiency, the upstream (i.e., the concentration of $NO_x$ entering into the chamber before exposure to the filter medium) and downstream concentration (i.e. the concentration of $NO_x$ exiting the chamber relative after exposure to the filter medium) of NO and $NO_2$ were monitored with a MKS MULTI-GAS™ 2030D FTIR analyzer (MKS Instruments, Andover, MA). $NO_x$ removal efficiency was calculated according to the following formula where '$NO_x$' indicates the total concentration of NO and $NO_2$ in the respective stream.

In-situ deposition of ammonium bisulfate (ABS): The filter medium including the sample catalytic filter bags in-situ fouled at Innovative combustion Technologies by 400 ppm NO, 440 ppm $NH_3$, 3000 ppm $SO_2$ and 8% water moisture at 230° C. for 4 hours with a total flowrate of 23.3 standard cubic feet per minute (SCFM).

$NO_x$ reaction efficiency after ammonium bisulfate (ABS) deposition: The $NO_x$ removal efficiency of catalytic filter bags after ABS deposition was tested for at Innovative Combustion Technologies from a simulated flue gas at 230° C., as described above. The simulated flue gas contained 200 ppm NO, 1.5 ppm $NO_2$, 200 ppm $NH_3$, 10% $O_2$, 8% water moisture, and $N_2$ with a total flowrate of 23.3 standard cubic feet per minute (SCFM).

In-situ "flow-through" thermal regeneration by NO, $NO_2$, $NH_3$ and $SO_2$ gas mixture: During an in-situ thermal regeneration, a filter medium including 4 catalytic filter bags in-situ fouled as described above were used. A gas mixture set to a $NH_3/NO_x$ ratio of 1.0, and including 200 ppm NO, 1 ppm $NO_2$, 200 ppm $NH_3$, 12 ppm $SO_2$, 10% $O_2$, 8% water moisture, and $N_2$ was first increased to 260° C. and set to flow-through the catalytic filter bags at 260° C. with a total flowrate of 22.0 SCFM for 18 hours.

$NO_x$ reaction efficiency after thermal regeneration: The $NO_x$ removal efficiency of catalytic filter bags after thermal regeneration was tested for at Innovative Combustion Technologies from a simulated flue gas at 230° C., as described above. The simulated flue gas contained 200 ppm NO, 1.5 ppm $NO_2$, 200 ppm $NH_3$, 10% $O_2$, 8% water moisture, and $N_2$ with a total flowrate of 23.3 standard cubic feet per minute (SCFM).

Figure 3:
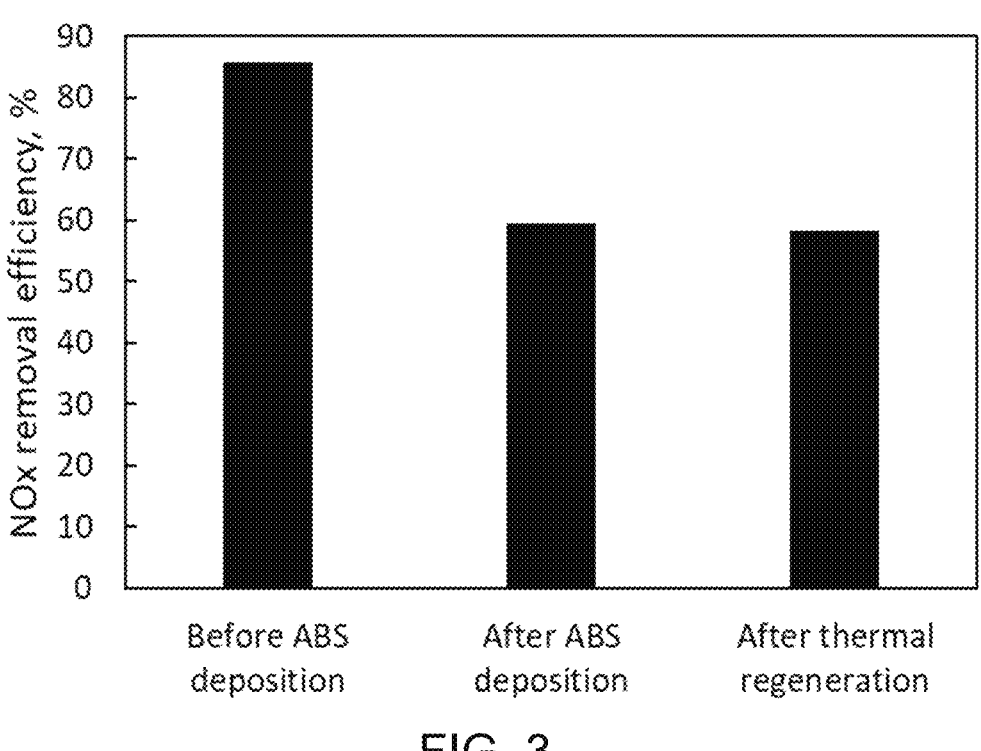
FIG. 3 depicts a comparative $NO_x$ removal efficiency before ammonium bisulfate deposition, after ammonium bisulfate deposition, and after thermal regeneration of filter medium(s) described herein.

Results of the Comparative Example: FIG. 3 shows the $NO_x$ removal efficiencies for (1) Before ammonium bisulfate (ABS) deposition; (2) after ABS deposition; and (3) after thermal regeneration (by $NH_3/NO_x$=1.0, 12 ppm $SO_2$ mixture at 260° C.) on catalytic filter bags. FIG. 3 shows that the $NO_x$ removal efficiency before the ABS deposition is higher than the $NO_x$ removal efficiency after ABS deposition. FIG. 3 shows that the $NO_x$ removal efficiency after the thermal regeneration is not higher than the $NO_x$ removal efficiency after ABS deposition. FIG. 3 also shows that the $NO_x$ removal efficiency before the ABS deposition is higher than the $NO_x$ removal efficiency after the thermal regeneration.

Example 3: In-Situ "Flow-Through" Thermal Regeneration of Filter Medium Including Catalytic Filter Bags by NO, $NO_2$ and $NH_3$ Gas Mixture Four catalytic filter bags (65 mm in diameter, 1630 mm in length) were prepared from the catalytic composite articles as described in Example 1.

$NO_x$ reaction efficiency before ammonium bisulfate (ABS) deposition: The filter medium including the sample catalytic filter bags were tested for $NO_x$ removal efficiency at Innovative Combustion Technologies from a simulated flue gas at 230° C. The simulated flue gas contained 400 ppm NO, 4 ppm $NO_2$, 400 ppm $NH_3$, 10% $O_2$, 8% water moisture, and $N_2$ with a total flowrate of 23 standard cubic feet per minute (SCFM). In order to determine $NO_x$ removal efficiency, the upstream (i.e., the concentration of $NO_x$ entering into the chamber before exposure to the filter medium) and downstream concentration (i.e. the concentration of $NO_x$ exiting the chamber relative after exposure to the filter medium) of NO and $NO_2$ were monitored with a MKS MULTI-GAS™ 2030D FTIR analyzer (MKS Instruments, Andover, MA). $NO_x$ removal efficiency was calculated according to the following formula where '$NO_x$' indicates the total concentration of NO and $NO_2$ in the respective stream.

In-situ deposition of ammonium bisulfate (ABS): The filter medium including the sample catalytic filter bags in-situ fouled at Innovative combustion Technologies by 400 ppm NO, 450 ppm $NH_3$, 3000 ppm $SO_2$ and 8% water moisture at 230° C. for 4 hours with a total flowrate of 23 standard cubic feet per minute (SCFM).

$NO_x$ reaction efficiency after ammonium bisulfate (ABS) deposition: The $NO_x$ removal efficiency of catalytic filter bags after ABS deposition was tested for at Innovative Combustion Technologies from a simulated flue gas at 230° C., as described above. The simulated flue gas contained 400 ppm NO, 5 ppm $NO_2$, 450 ppm $NH_3$, 10% $O_2$, 8% water moisture, and $N_2$ with a total flowrate of 23 standard cubic feet per minute (SCFM).

In-situ "flow-through" thermal regeneration by NO, $NO_2$, and $NH_3$ mixture: During an in-situ thermal regeneration, a filter medium including 4 catalytic filter bags in-situ fouled as described above were used. A gas mixture set to a $NH_3/NO_x$ ratio of 1.1, including <1 ppm of $SO_2$; and also including 400 ppm NO, 5 ppm $NO_2$, 450 ppm $NH_3$, 10% $O_2$, 8% water moisture, and $N_2$ was first increased to 260° C. and set to flow-through the catalytic filter bags at 260° C. with a total flowrate of 24 SCFM for 2 hours.

$NO_x$ reaction efficiency after thermal regeneration: The $NO_x$ removal efficiency of catalytic filter bags after 2 hours of thermal regeneration with $NH_3$ was tested for at Innovative Combustion Technologies from a simulated flue gas at 260° C., as described above. The simulated flue gas contained 400 ppm NO, 4 ppm $NO_2$, 400 ppm $NH_3$, 10% 02, 8% water moisture, and $N_2$ with a total flowrate of 24 standard cubic feet per minute (SCFM).

The $NO_x$ removal efficiency of catalytic filter bags after thermal regeneration was later tested for at Innovative Combustion Technologies from a simulated flue gas at 230° C., as described above. The simulated flue gas contained 400 ppm NO, 2 ppm $NO_2$, 400 ppm $NH_3$, 10% $O_2$, 8% water moisture, and $N_2$ with a total flowrate of 23 standard cubic feet per minute (SCFM).

Figure 4:
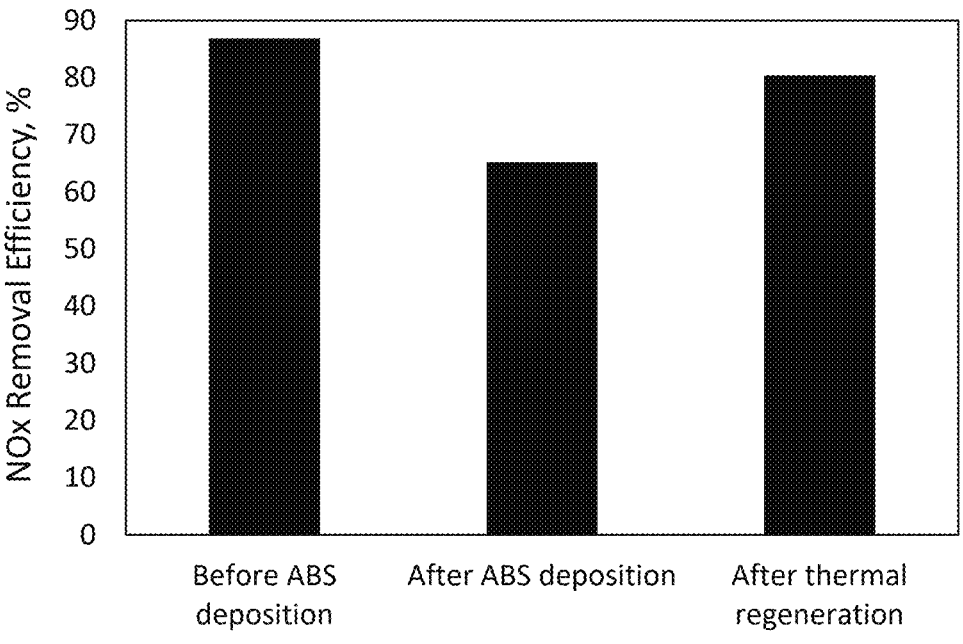
FIG. 4 depicts a further exemplary $NO_x$ removal efficiency before ammonium bisulfate deposition, after ammonium bisulfate deposition, and after thermal regeneration of filter medium(s) described herein.

Results: FIG. 4 shows the $NO_x$ removal efficiencies for (1) Before ammonium bisulfate (ABS) deposition; (2) after ABS deposition; and (3) after thermal regeneration (by $NH_3/NO_x$=1.1, <1 ppm $SO_2$ mixture at 260° C.) on catalytic filter bags. FIG. 4 shows that the $NO_x$ removal efficiency before the ABS deposition is higher than the $NO_x$ removal efficiency after ABS deposition. FIG. 4 shows that the $NO_x$ removal efficiency after the thermal regeneration is higher than the $NO_x$ removal efficiency after ABS deposition. FIG. 4 also shows that the $NO_x$ removal efficiency before the ABS deposition is higher than the $NO_x$ removal efficiency after the thermal regeneration, but the thermal regeneration $NO_x$ removal efficiency value is substantially close to the value of the before the ABS deposition $NO_x$ removal efficiency value.

Example 4: In-Situ Deposition of Ammonium Bisulfate (ABS)

The filter medium including the sample catalytic filter bags in-situ fouled at Innovative Combustion Technologies by 400 ppm NO, 440 ppm $NH_3$, 3000 ppm $SO_2$ and 8% water moisture at 230° C. for 4 hours with a total flowrate of 23.3 standard cubic feet per minute (SCFM).

$NO_x$ reaction efficiency before in-situ "flow-through" thermal regeneration by NO, $NO_2$, and $NH_3$ mixture: The returned catalytic filter bags were tested for catalytic $NO_x$ removal efficiency from a simulated flue gas. Briefly, a sample with 30 mm diameter was placed in a sample holder located within a 3210 series furnace (Applied Test Systems). The sample was exposed to an $N_2$ balanced simulated flue gas at 232° C. The simulated flue gas contained 244 ppm NO, 1 ppm $NO_2$, 200 ppm $NH_3$, 6% $O_2$, and $N_2$ with a total flowrate of 0.62 L/min. In order to determine $NO_x$ removal efficiency, the upstream and downstream concentration (i.e. relative to the catalytic composite article) of $NO_x$ were monitored with a MKS MULTI-GAS™ 2030D FTIR analyzer (MKS Instruments, Andover, MA). $NO_x$ removal efficiency was calculated according to the following formula where '$NO_x$' indicates the total concentration of NO and $NO_2$ in the respective stream.

In-situ "flow-through" thermal regeneration by NO, $NO_2$, and $NH_3$ mixture: During an in-situ thermal regeneration, a sample with 30 mm diameter was placed in a sample holder located within a 3210 series furnace (Applied Test Systems). The sample was exposed to a $N_2$ balanced simulated flue gas at 245° C. for 33 hours. The simulated flue gas contained 244 ppm NO, 1 ppm $NO_2$, 60 ppm $NH_3$, 6% $O_2$, 5% water moisture and $N_2$ with a total flowrate of 0.62 L/min.

$NO_x$ reaction efficiency after thermal regeneration: The $NO_x$ removal efficiency after 33 hours of thermal regeneration with $NH_3$ was tested again from a simulated flue gas at 232° C., as described above. The simulated flue gas contained 244 ppm NO, 1 ppm $NO_2$, 200 ppm $NH_3$, 6% $O_2$, and $N_2$ with a total flowrate of 0.62 L/min.

Figure 5:
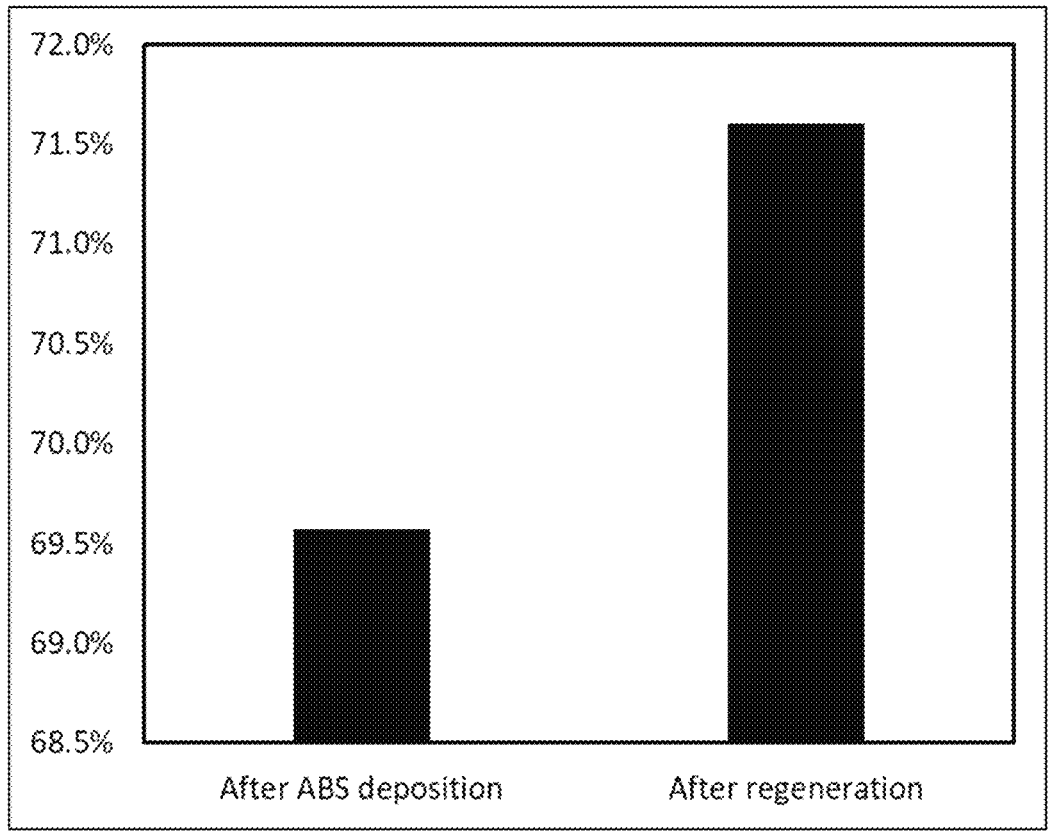
FIG. 5 depicts an exemplary $NO_x$ removal efficiency on a catalytic filter sample after ammonium bisulfate deposition and after thermal regeneration described herein.

Results: FIG. 5 shows the $NO_x$ removal efficiencies for (1) after ABS deposition; and (2) after thermal regeneration (in the presence of $NH_3$, at 245° C.). The Y-axis in FIG. 5 shows the $NO_x$ removal efficiency ranging from 68.5% to 72.0%. Although not shown in FIG. 5, it will be understood that the $NO_x$ removal efficiency before the ABS deposition is higher than the $NO_x$ removal efficiency after ABS deposition. FIG. 5 shows that the $NO_x$ removal efficiency after the thermal regeneration is higher than the $NO_x$ removal efficiency after ABS deposition.

Aspects:

Various aspects are described below. Any of the following aspects or any portions thereof can be combined with any of the other aspects or any portions thereof.

Aspect 1: A method comprising:

providing at least one filter medium;
   wherein the at least one filter medium comprises:
      at least one catalyst material; and
      ammonium bisulfate (ABS), ammonium sulfate (AS), or
      any combination thereof;
flowing a flue gas stream through or by the at least one filter medium;
   wherein the flue gas stream comprises:
      $NO_x$ compounds comprising:
         Nitric Oxide (NO), and
         Nitrogen Dioxide ($NO_2$);
   wherein the flue gas stream is at a first temperature during the flowing step;
increasing $NO_x$ removal efficiency of the at least one filter medium;
   wherein the increasing of the $NO_x$ removal efficiency of the at least one filter medium comprises:
      adding ammonia ($NH_3$) in a concentration ranging from 0.0001% to 0.5% of the concentration of the flue gas stream; and
      increasing the temperature of the flue gas stream from the first temperature to a second temperature that exceeds the first temperature;
wherein the method regenerates the at least one filter medium.

Aspect 2: The method of aspect 1, wherein the second temperature is at least 10° C. higher than the first temperature.

Aspect 3: The method of aspect 1 or aspect 2, wherein the second temperature is 10° C. to 100° C. higher than the first temperature.

Aspect 4: The method of any of the preceding aspects or any combination thereof, wherein the first temperature ranges from 180° C. to 230° C.

Aspect 5: The method of any of the preceding aspects or any combination thereof, wherein the second temperature is at least 240° C.

Aspect 6: The method of any of the preceding aspects or any combination thereof, wherein the second temperature is at most 280° C.

Aspect 7: The method of any of the preceding aspects or any combination thereof, wherein the second temperature ranges from 240° C. to 280° C.

Aspect 8: The method of any of the preceding aspects or any combination thereof, wherein the second temperature ranges from 240° C. to 260° C.

Aspect 9: The method of any of the preceding aspects, or any combination thereof, wherein the flue gas stream further comprises at least one of Oxygen ($O_2$), Water ($H_2O$), Nitrogen ($N_2$), Carbon Monoxide (CO), Sulfur Dioxide ($SO_2$), Sulfur Trioxide ($SO_3$), one or more hydrocarbons, or any combination thereof.

Aspect 10: The method of any of the preceding aspects or any combination thereof, wherein the flue gas stream is flowed transverse to a cross-section of the at least one filter medium, such that the flue gas stream passes through the cross section of the at least one filter medium.

Aspect 11: The method according to any of aspects 1 to 10 or any combination thereof, wherein the flue gas stream is not flowed transverse to a cross-section of the at least one filter medium, such that the flue gas stream does not pass through the cross section of the at least one filter medium.

Aspect 12: The method of aspect 10, wherein the flue gas stream is flowed perpendicular to a cross-section of the at least one filter medium.

Aspect 13: The method of aspect 11, wherein the flue gas stream is flowed parallel to a cross-section of the at least one filter medium.

Aspect 14: The method according to any of aspects 1-10, 12, or any combination thereof, wherein the at least one filter medium is disposed within at least one filter bag, wherein the at least one filter bag is housed within at least one filter bag housing, and wherein the at least one catalyst material is in the form of catalyst particles.

Aspect 15: The method according to any of aspects 1-11, 13, or any combination thereof, or any combination thereof, wherein the at least one filter medium comprises a porous protective layer and a porous catalytic layer, wherein the porous catalytic layer comprises the at least one catalyst material.

Aspect 16: The method of aspect 15, wherein the porous protective layer comprises a microporous layer, wherein the microporous layer comprises an expanded polytetrafluoroethylene (ePTFE) membrane.

Aspect 17: The method of any of the preceding aspects, or any combination thereof, wherein the at least one catalyst material is adhered to the filter medium by at least one adhesive.

Aspect 18: The method of aspect 17, wherein the at least one adhesive is chosen from polytetrafluoroethylene (PTFE), fluorinated ethylene propylene (FEP), high molecular weight polyethylene (HMWPE), high molecular weight polypropylene (HMWPP), perfluoroalkoxy alkane (PFA), polyvinylidene fluoride (PVDF), vinylidene fluoride (THV), chlorofluoroethylene (CFE), or any combination thereof.

Aspect 19: The method according to any of aspects 15-18, or any combination thereof, wherein the porous catalytic layer comprises at least one polymeric substrate.

Aspect 20: The method of aspect 19, wherein the at least one polymeric substrate comprises at least one of: polytetrafluoroethylene, poly(ethylene-co-tetrafluoroethylene), ultra-high molecular weight polyethylene, polyparaxylylene, polylactic acid, polyimide, polyamide, polyaramid, polyphenylene sulfide, fiberglass, or any combination thereof.

Aspect 21: The method of aspect 15, wherein the porous catalytic layer is in the form of a layered assembly comprising a porous catalytic film and one or more felt batts, wherein the one or more felt batts are positioned on at least one side of the porous catalytic film.

Aspect 22: The method of aspect 21, wherein the one or more felt batts comprise at least one of: a polytetrafluoroethylene (PTFE) felt, a PTFE fleece, an expanded polytetrafluoroethylene (ePTFE) felt, an ePTFE fleece, a woven fluoropolymer staple fiber, a nonwoven fluoropolymer staple fiber, or any combination thereof.

Aspect 23: The method of aspect 21, 22, or any combination thereof, wherein the porous catalytic film comprises an expanded polytetrafluoroethylene (ePTFE) membrane.

Aspect 24: The method of aspects 14, 22-23, or any combination thereof, wherein the catalyst particles are enmeshed within the porous catalytic layer.

Aspect 25: The method of aspects 15-24, or any combination thereof, wherein the porous catalytic layer comprises a least one of: polytetrafluoroethylene (PTFE), poly(ethylene-co-tetrafluoroethylene) (ETFE), ultra-high molecular weight polyethylene (UHMWPE), polyparaxylylene (PPX), polylactic acid, polyimide, polyamide, polyaramid, polyphenylene sulfide, fiberglass, or any combination thereof.

Aspect 26: The method of any of the preceding aspects or any combination thereof, wherein the at least one catalyst material comprises at least one of: Vanadium Monoxide (VO), Vanadium Trioxide ($V_2O_3$), Vanadium Dioxide ($VO_2$), Vanadium Pentoxide ($V_2O_5$), Tungsten Trioxide ($WO_3$), Molybdenum Trioxide ($MoO_3$), Titanium Dioxide ($TiO_2$), Silicon Dioxide ($SiO_2$), Aluminum Trioxide ($Al_2O_3$), Manganese Oxide ($MnO_2$), zeolites, or any combination thereof.

Aspect 27: The method of any of the preceding aspects or any combination thereof, wherein ABS deposits are disposed on the catalyst material of the at least one filter medium in a concentration ranging from 0.01% to 99% by mass of the at least one filter medium during the providing step.

Aspect 28: The method of any of the preceding aspects or any combination thereof, wherein ABS deposits are disposed on the catalyst material of the at least one filter medium in a concentration ranging from 0.01% to 98% by mass of the at least one filter medium after the increasing step.

Aspect 29: The method of any of the preceding aspects or any combination thereof, wherein the $NO_x$ removal efficiency of the at least one filter medium is at least 0.5% higher after the increasing step than during the providing step.

Aspect 30: The method of any of the preceding aspects or any combination thereof, wherein the at least one filter medium is in the form of at least one of: a filter bag, a honeycomb structure, a monolith structure or any combination thereof.

Aspect 31: The method of any of the preceding aspects or any combination thereof, wherein the increasing of the $NO_x$ removal efficiency comprises removing at least some of the ABS deposits, the AS deposits, or any combination thereof, from the at least one filter medium.

Aspect 32: A method comprising:

providing at least one filter medium, wherein the at least one filter medium comprises at least one catalyst material;

flowing a flue gas stream transverse to a cross-section of the at least one filter medium, such that the flue gas stream passes through the cross section of the at least one filter medium from an upstream side of the filter medium to a downstream side of the filter medium;

wherein the flue gas stream comprises:

$NO_x$ compounds comprising:

Nitric Oxide (NO), and

Nitrogen Dioxide ($NO_2$);

Sulfur Dioxide ($SO_2$); and

Ammonia ($NH_3$);

wherein the flue gas stream is at a first temperature during the flowing step; and maintaining a constant $NO_x$ removal efficiency of the at least one filter medium; wherein the maintaining a constant $NO_x$ removal efficiency of the at least one filter medium comprises increasing the temperature of the flue gas stream from the first temperature to a second temperature that exceeds the first temperature;

wherein the method cleans the flue gas stream.

Aspect 33: The method of aspect 32, wherein at least during the flowing step, the $SO_2$, $NH_3$, and $NO_x$ compounds are present in an amount of at least 1 mg/m$^3$ based on a total volume of the flue gas stream.

Aspect 34: The method according to any of aspect 32, 33, or any combination thereof, wherein the second temperature is at least 10° C. higher than the first temperature.

Aspect 35: The method according to any of aspects 32-34, or any combination thereof, wherein the second temperature is 10° C. to 100° C. higher than the first temperature.

Aspect 36: The method according to any of aspects 32-35, or any combination thereof, wherein the first temperature ranges from 180° C. to 230° C.

Aspect 37: The method according to any of aspects 32-36, or any combination thereof, wherein the second temperature is at least 240° C.

Aspect 38: The method according to any of aspects 32-37, or any combination thereof, wherein the second temperature is at most 280° C.

Aspect 39: The method according to any of aspects 32-38, or any combination thereof, wherein the second temperature ranges from 240° C. to 280° C.

Aspect 40: The method according to any of aspects 32-39, or any combination thereof, wherein the second temperature ranges from 240° C. to 260° C.

Aspect 41: The method according to any of aspects 32-40, or any combination thereof, wherein a concentration of $SO_2$ in the flue gas stream does not exceed 1000 ppm during the maintaining step.

Aspect 42: The method according to any of aspects 32-41, or any combination thereof, wherein a concentration of $SO_2$ in the flue gas stream does not exceed 10 ppm during the maintaining step.

Aspect 43: A method comprising:

providing at least one filter medium wherein the at least one filter medium comprises at least one catalyst material;

flowing a flue gas stream by a cross-section of the at least one filter medium, such that the flue gas stream is flowed parallel to a cross-section of the at least one filter medium from an upstream side of the filter medium to a downstream side of the filter medium;

wherein the flue gas stream comprises:

$NO_x$ compounds comprising:

Nitric Oxide (NO), and

Nitrogen Dioxide ($NO_2$);

Sulfur Dioxide ($SO_2$); and

Ammonia ($NH_3$);

wherein the flue gas stream is at a first temperature during the flowing step;

maintaining a constant $NO_x$ removal efficiency of the at least one filter medium; wherein the maintaining a constant $NO_x$ removal efficiency of the at least one filter medium comprises increasing the temperature of the flue gas stream from the first temperature to a second temperature that exceeds the first temperature;

wherein the method cleans the flue gas stream.

Aspect 44: The method of aspect 43, wherein at least during the flowing step, the $SO_2$, $NH_3$, and $NO_x$ compounds are present in an amount of at least 1 mg/m$^3$ based on a total volume of the flue gas stream.

Aspect 45: The method according to any of aspect 43 or 44, wherein the at least one filter medium is in the form of at least one of: a honeycomb structure, a monolith structure, or any combination thereof.

Aspect 46: The method according to any of aspect 43-45, or any combination thereof, wherein the second temperature is at least 10° C. higher than the first temperature.

Aspect 47: The method according to any of aspects 43-46, or any combination thereof, wherein the second temperature is 10° C. to 100° C. higher than the first temperature.

Aspect 48: The method according to any of aspects 43-47, or any combination thereof, wherein the first temperature ranges from 180° C. to 230° C.

Aspect 49: The method according to any of aspects 43-48, or any combination thereof, wherein the second temperature is at least 240° C.

Aspect 50: The method according to any of aspects 43-49, or any combination thereof, wherein the second temperature is at most 280° C.

Aspect 51: The method according to any of aspects 43-50, or any combination thereof, wherein the second temperature ranges from 240° C. to 280° C.

Aspect 52: The method according to any of aspects 43-51, or any combination thereof, wherein the second temperature ranges from 240° C. to 260° C.

Aspect 53: The method according to any of aspects 43-52, or any combination thereof, wherein a concentration of $SO_2$ in the flue gas stream does not exceed 1000 ppm during the maintaining step.

Aspect 54: The method according to any of aspects 43-52, or any combination thereof, wherein a concentration of $SO_2$ in the flue gas stream does not exceed 10 ppm during the maintaining step.

Aspect 55: The method according to any of aspects 1 to 54, or any combination thereof, wherein the first temperature of the flue gas stream is increased to the second temperature periodically, so as to maintain the $NO_x$ removal efficiency in an amount of at least 70% of an initial $NO_x$ efficiency.

Aspect 56: The method of aspect 55, wherein the periodic increasing comprises increasing the first temperature to the second temperature every 1 to 40,000 hours.

Aspect 57: The method according to any of aspect 55, 56, or any combination thereof, wherein the periodic increasing occurs at constant time intervals.

Aspect 58: The method according to any of aspect 55, 56, or any combination thereof, wherein the periodic increasing occurs at variable time intervals.

Aspect 59: The method of aspect 58, wherein variable time intervals are random time intervals.

Aspect 60: The method according to any of aspects 1 to 59 or any combination thereof, wherein the first temperature of the flue gas stream is increased to the second temperature continuously, so as to maintain the $NO_x$ removal efficiency in an amount of at least 70% of an initial $NO_x$ efficiency.

Aspect 61: A method comprising:

providing at least one filter medium wherein the at least one filter medium comprises at least one catalyst material;

flowing a flue gas stream transverse to a cross-section of the at least one filter medium, such that the flue gas stream passes through the cross section of the at least one filter medium from an upstream side of the filter medium to a downstream side of the filter medium;

wherein the flue gas stream comprises:

$NO_x$ compounds comprising:

Nitric Oxide (NO), and

Nitrogen Dioxide ($NO_2$);

Sulfur Dioxide ($SO_2$); and

Ammonia ($NH_3$);

wherein the flue gas stream is at a first temperature during the flowing step;

maintaining a $NO_x$ removal efficiency of the at least one filter medium in an amount of at least 70% of an initial $NO_x$ efficiency by increasing the temperature of the flue gas stream from the first temperature to a second temperature that exceeds the first temperature;

wherein the method cleans the flue gas stream.

Aspect 62: The method of aspect 61, wherein the $NO_x$ removal efficiency of the at least one filter medium is maintained in a range of 70% to 99% of the initial $NO_x$ efficiency.

Aspect 63: The method according to any of aspect 61 or 62, wherein the second temperature is at least 10° C. higher than the first temperature.

Aspect 64: The method according to any of aspects 61-63 or any combination thereof, wherein the second temperature is 10° C. to 100° C. higher than the first temperature.

Aspect 65: The method according to any of aspects 61-64 or any combination thereof, wherein the first temperature ranges from 180° C. to 230° C.

Aspect 66: The method according to any of aspects 61-65 or any combination thereof, wherein the second temperature is at least 240° C.

Aspect 67: The method according to any of aspects 61-66, or any combination thereof, wherein the second temperature is at most 280° C.

Aspect 68: The method according to any of aspects 61-67 or any combination thereof, wherein the second temperature ranges from 240° C. to 280° C.

Aspect 69: The method according to any of aspects 61-68 or any combination thereof, wherein the second temperature ranges from 240° C. to 260° C.

Aspect 70: The method according to any of aspects 61-69, or any combination thereof, wherein a concentration of $SO_2$ in the flue gas stream does not exceed 1000 ppm during the maintaining step.

Aspect 71: The method according to any of aspects 61-70, or any combination thereof, wherein a concentration of $SO_2$ in the flue gas stream does not exceed 10 ppm during the maintaining step.

Aspect 72: The method according to any of aspects 1-31, or any combination thereof, wherein a concentration of $SO_2$ in the flue gas stream does not exceed 1000 ppm during the step of increasing the $NO_x$ removal efficiency of the at least one filter medium.

Aspect 73: The method according to any of aspects 1-31, 72, or any combination thereof, wherein a concentration of $SO_2$ in the flue gas stream does not exceed 10 ppm during the step of increasing the $NO_x$ removal efficiency of the at least one filter medium.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A method comprising:

providing at least one filter medium;

wherein the at least one filter medium comprises:

at least one catalyst material; and ammonium bisulfate (ABS), ammonium sulfate (AS), or any combination thereof;

flowing a flue gas stream through or by the at least one filter medium;

wherein the flue gas stream comprises:

$NO_x$ compounds comprising:

Nitric Oxide (NO), and

Nitrogen Dioxide ($NO_2$); and

Sulfur Dioxide (SO2);

wherein the flue gas stream is at a first temperature during the flowing step;

increasing $NO_x$ removal efficiency of the at least one filter medium;

wherein the increasing of the $NO_x$ removal efficiency of the at least one filter medium comprises:

adding ammonia ($NH_3$) in a concentration ranging from 0.0001% to 0.5% of the concentration of the flue gas stream; and increasing the temperature of the flue gas stream from the first temperature to a second temperature that exceeds the first temperature;

wherein a concentration of SO2 in the flue gas stream does not exceed 12 ppm during the step of increasing the $NO_x$ removal efficiency of the at least one filter medium:

wherein the method regenerates the at least one filter medium.

2. The method of claim 1, wherein the second temperature is 10° C. to 100° C. higher than the first temperature.

3. The method of claim 1, wherein the first temperature ranges from 180° C. to 230° C.

4. The method of claim 1, wherein the second temperature ranges from 240° C. to 280° C.

5. The method of claim 1, wherein the flue gas stream is flowed transverse to a cross-section of the at least one filter medium, such that the flue gas stream passes through a cross section of the at least one filter medium.

6. The method of claim 1, wherein the flue gas stream is not flowed transverse to a cross-section of the at least one filter medium, such that the flue gas stream does not pass through a cross section of the at least one filter medium.

7. The method of claim 1, wherein the flue gas stream is flowed perpendicular to a cross-section of the at least one filter medium.

8. The method of claim 1, wherein the flue gas stream is flowed parallel to a cross-section of the at least one filter medium.

9. The method of claim 1, wherein the at least one filter medium is disposed within at least one filter bag, wherein the at least one filter bag is housed within at least one filter bag housing, and wherein the at least one catalyst material is in a form of catalyst particles.

10. The method of claim 1, wherein the flue gas stream further comprises at least one of Oxygen ($O_2$), Water ($H_2O$), Nitrogen ($N_2$), Carbon Monoxide (CO), Sulfur Trioxide ($SO_3$), one or more hydrocarbons, or any combination thereof.

11. The method of claim 1, wherein the first temperature of the flue gas stream is increased to the second temperature continuously, so as to maintain the $NO_x$ removal efficiency in an amount of at least 70% of an initial $NO_x$ efficiency.

12. The method of claim 1, wherein the at least one filter medium comprises a porous protective layer and a porous catalytic layer, wherein the porous catalytic layer comprises the at least one catalyst material.

13. The method of claim 12, wherein the porous protective layer comprises a microporous layer, wherein the microporous layer comprises an expanded polytetrafluoroethylene (ePTFE) membrane.

14. The method of claim 12, wherein the at least one catalyst material comprises at least one of: Vanadium Monoxide (VO), Vanadium Trioxide ($V_2O_3$), Vanadium Dioxide ($VO_2$), Vanadium Pentoxide ($V_2O_5$), Tungsten Trioxide ($WO_3$), Molybdenum Trioxide ($MoO_3$), Titanium Dioxide ($TiO_2$), Silicon Dioxide ($SiO_2$), Aluminum Trioxide ($Al_2O_3$), Manganese Oxide ($MnO_2$), zeolites, or any combination thereof.

15. The method of claim 12, wherein the at least one catalyst material is adhered to the filter medium by at least one adhesive.

16. The method of claim 15, wherein the at least one adhesive is chosen from polytetrafluoroethylene (PTFE), fluorinated ethylene propylene (FEP), high molecular weight polyethylene (HMWPE), high molecular weight polypropylene (HMWPP), perfluoroalkoxy alkane (PFA), polyvinylidene fluoride (PVDF), vinylidene fluoride (THV), chlorofluoroethylene (CFE), or any combination thereof.

17. A method comprising:

providing at least one filter medium, wherein the at least one filter medium comprises at least one catalyst material;

flowing a flue gas stream transverse to a cross-section of the at least one filter medium, such that the flue gas stream passes through a cross section of the at least one filter medium from an upstream side of the filter medium to a downstream side of the filter medium;

wherein the flue gas stream comprises:

$NO_x$ compounds comprising:

Nitric Oxide (NO), and

Nitrogen Dioxide ($NO_2$);

Sulfur Dioxide ($SO_2$); and

Ammonia ($NH_3$);

wherein the flue gas stream is at a first temperature during the flowing step; and maintaining a constant $NO_x$ removal efficiency of the at least one filter medium;

wherein the maintaining a constant $NO_x$ removal efficiency of the at least one filter medium comprises increasing the temperature of the flue gas stream from the first temperature to a second temperature that exceeds the first temperature;

wherein a concentration of $SO_2$ in the flue gas stream does not exceed 12 ppm during the step of increasing the $NO_x$ removal efficiency of the at least one filter medium:

wherein the method cleans the flue gas stream.

18. The method of claim 17, wherein at least during the flowing step, the $SO_2$, $NH_3$, and $NO_x$ compounds are present in an amount of at least 1 mg/m$^3$ based on a total volume of the flue gas stream.

19. A method comprising:

providing at least one filter medium, wherein the at least one filter medium comprises at least one catalyst material;

flowing a flue gas stream by a cross-section of the at least one filter medium, such that the flue gas stream is flowed parallel to a cross-section of the at least one filter medium from an upstream side of the filter medium to a downstream side of the filter medium;

wherein the flue gas stream comprises:

$NO_x$ compounds comprising:

Nitric Oxide (NO), and

Nitrogen Dioxide ($NO_2$);

Sulfur Dioxide ($SO_2$); and

Ammonia ($NH_3$);

wherein the flue gas stream is at a first temperature during the flowing step;

maintaining a constant $NO_x$ removal efficiency of the at least one filter medium;

wherein the maintaining a constant $NO_x$ removal efficiency of the at least one filter medium comprises increasing the temperature of the flue gas stream from the first temperature to a second temperature that exceeds the first temperature;

wherein a concentration of SO2 in the flue gas stream does not exceed 12 ppm during the step of increasing the $NO_x$ removal efficiency of the at least one filter medium:

wherein the method cleans the flue gas stream.

20. A method comprising:

providing at least one filter medium wherein the at least one filter medium comprises at least one catalyst material;

flowing a flue gas stream transverse to a cross-section of the at least one filter medium, such that the flue gas stream passes through a cross section of the at least one filter medium from an upstream side of the filter medium to a downstream side of the filter medium;

wherein the flue gas stream comprises:

$NO_x$ compounds comprising:
  Nitric Oxide (NO), and
  Nitrogen Dioxide ($NO_2$);
Sulfur Dioxide ($SO_2$); and
Ammonia ($NH_3$);
wherein the flue gas stream is at a first temperature during the flowing step;
maintaining a $NO_x$ removal efficiency of the at least one filter medium in an amount of at least 70% of an initial $NO_x$ efficiency by increasing the temperature of the flue gas stream from the first temperature to a second temperature that exceeds the first temperature; wherein a concentration of SO2 in the flue gas stream does not exceed 12 ppm during the step of increasing the $NO_x$ removal efficiency of the at least one filter medium; wherein the method cleans the flue gas stream.

\* \* \* \* \*